Figure 5:
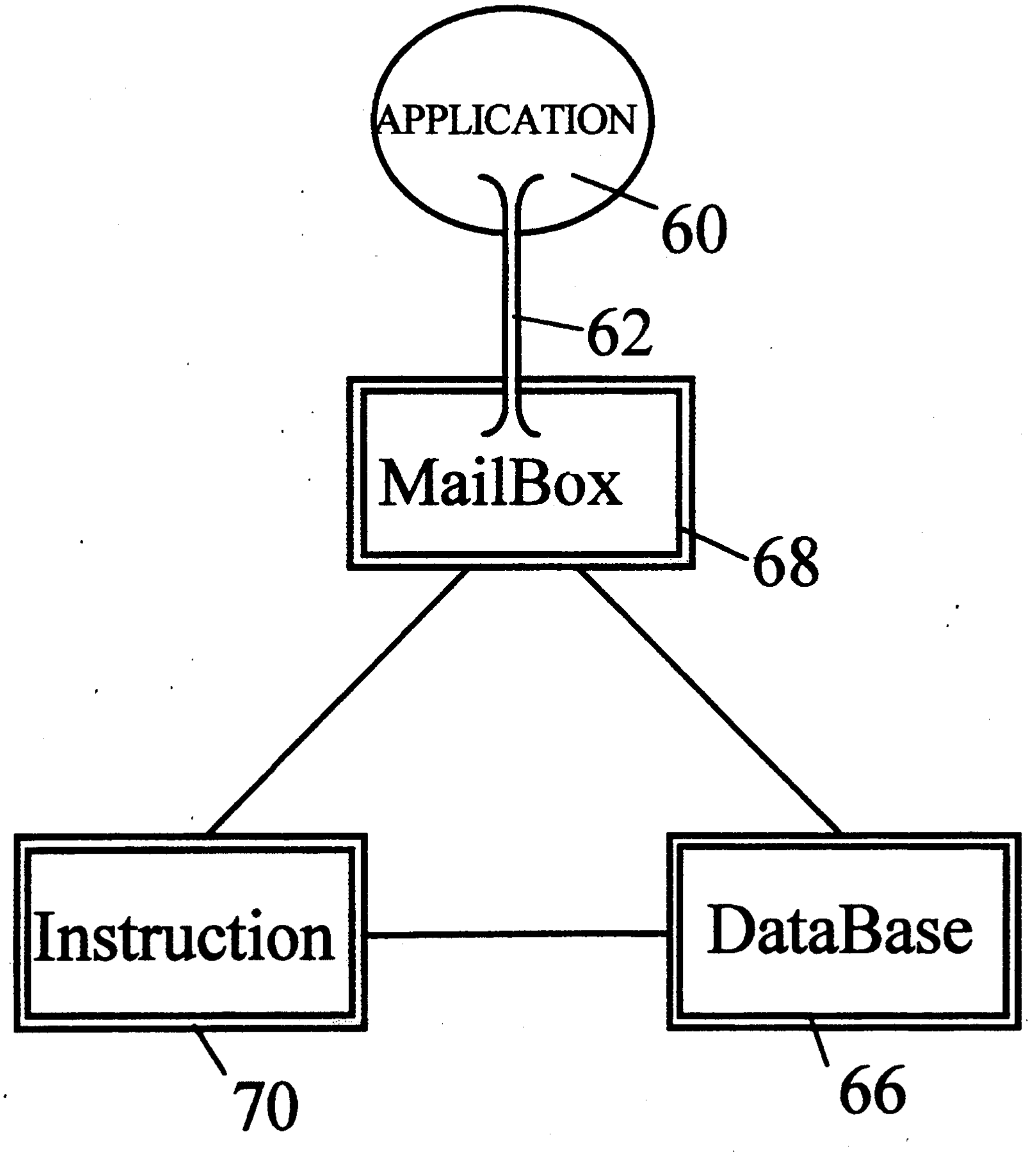

US005423038A

United States Patent [19]

Davis

[11] Patent Number: 5,423,038

[45] Date of Patent: Jun. 6, 1995

[54] SPECIALIZED DATA MANAGEMENT METHOD

[76] Inventor: Marilyn Davis, 3790 El Camino Real, #147, Palo Alto, Calif. 94306

[21] Appl. No.: 960,948

[22] Filed: Oct. 14, 1992

[51] Int. Cl.[6] .............................. G06F 17/40

[52] U.S. Cl. .............................. 395/650; 364/DIG. 1; 364/283.3

[58] Field of Search .............. 395/600, 650; 364/409

[56] References Cited

U.S. PATENT DOCUMENTS

| | | | |
|---|---|---|---|
| 4,644,471 | 2/1987 | Kojima et al. . | |
| 4,677,550 | 6/1987 | Ferguson | 364/DIG. 1 |
| 4,680,705 | 7/1987 | Shu . | |
| 4,774,665 | 9/1988 | Webb | 364/409 |
| 4,811,199 | 3/1989 | Kuechler et al. | 364/DIG. 1 |
| 4,821,175 | 4/1989 | Hikita et al. | 364/DIG. 1 |
| 5,023,832 | 6/1991 | Fulcher, Jr. et al. | 364/DIG. 2 |
| 5,046,002 | 9/1991 | Takashi et al. | 364/DIG. 1 |
| 5,062,147 | 10/1991 | Pickett et al. | 364/DIG. 2 |
| 5,121,493 | 6/1992 | Ferguson | 364/DIG. 1 |
| 5,121,495 | 6/1992 | Nemes | 364/DIG. 1 |
| 5,218,528 | 6/1993 | Wise et al. | 364/409 |

OTHER PUBLICATIONS

Cattell, R. G. G., "Object Data Management, Object-Oriented and Extended Relational Database Systems", Addison-Wesley Publishing Co., pp. 74, 75, 209, 215, 216.

Camber-Roth, "Customizing the Caucus User Interface", pp. 9-1 to 9-5.

*Primary Examiner*—Thomas M. Heckler

[57] ABSTRACT

A specialized data management method wherein schema-evolution is handled transparently by the end-user at run time, the data are groomed according to certain rules, and the grooming tasks are performed, if possible, when the computer system is otherwise idle, or at least when the data management system is otherwise idle. These mechanisms allow the data to be stored with optimal compactness and clustering, enabling the fastest possible storage and retrieval rates. The method supplies a high-level programming language extension, thereby enabling the data management system to take on most of the responsibilities of the application. The exemplary embodiment of a data management system using the method is a vote-server for use in groupware applications.

15 Claims, 14 Drawing Sheets

THE EXECUTION OF A REQUEST

FIG. 1

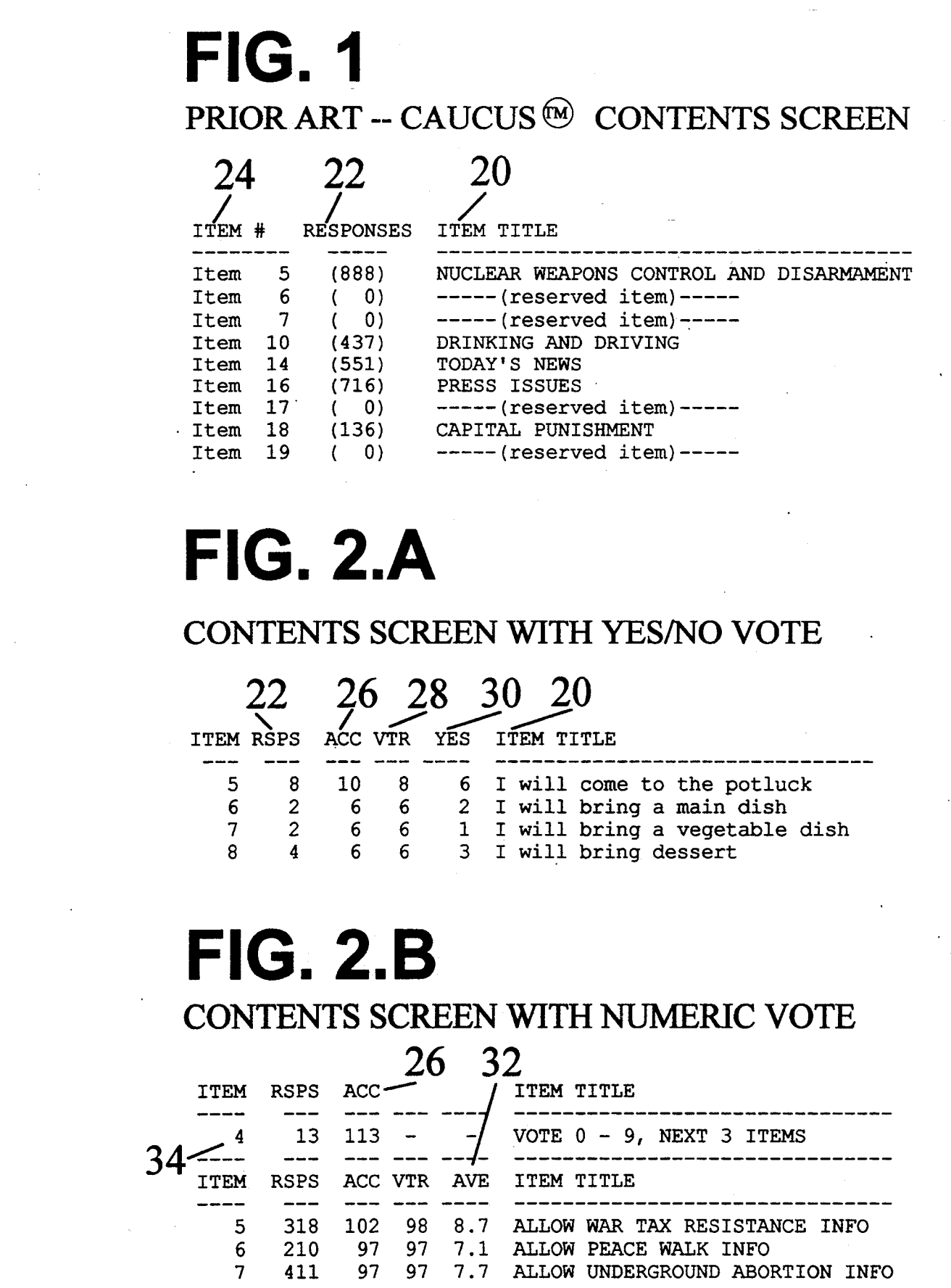

PRIOR ART -- CAUCUS™ CONTENTS SCREEN 24 22 20

| ITEM # | RESPONSES | ITEM TITLE |
|---|---|---|
| Item 5 | (888) | NUCLEAR WEAPONS CONTROL AND DISARMAMENT |
| Item 6 | ( 0) | -----(reserved item)----- |
| Item 7 | ( 0) | -----(reserved item)----- |
| Item 10 | (437) | DRINKING AND DRIVING |
| Item 14 | (551) | TODAY'S NEWS |
| Item 16 | (716) | PRESS ISSUES |
| Item 17 | ( 0) | -----(reserved item)----- |
| Item 18 | (136) | CAPITAL PUNISHMENT |
| Item 19 | ( 0) | -----(reserved item)----- |

FIG. 2.A

CONTENTS SCREEN WITH YES/NO VOTE 22 26 28 30 20

| ITEM | RSPS | ACC | VTR | YES | ITEM TITLE |
|---|---|---|---|---|---|
| 5 | 8 | 10 | 8 | 6 | I will come to the potluck |
| 6 | 2 | 6 | 6 | 2 | I will bring a main dish |
| 7 | 2 | 6 | 6 | 1 | I will bring a vegetable dish |
| 8 | 4 | 6 | 6 | 3 | I will bring dessert |

FIG. 2.B

CONTENTS SCREEN WITH NUMERIC VOTE 26 32

| ITEM | RSPS | ACC | | | ITEM TITLE |
|---|---|---|---|---|---|
| 4 | 13 | 113 | - | - | VOTE 0 - 9, NEXT 3 ITEMS |

34

| ITEM | RSPS | ACC | VTR | AVE | ITEM TITLE |
|---|---|---|---|---|---|
| 5 | 318 | 102 | 98 | 8.7 | ALLOW WAR TAX RESISTANCE INFO |
| 6 | 210 | 97 | 97 | 7.1 | ALLOW PEACE WALK INFO |
| 7 | 411 | 97 | 97 | 7.7 | ALLOW UNDERGROUND ABORTION INFO |

Figure 2:
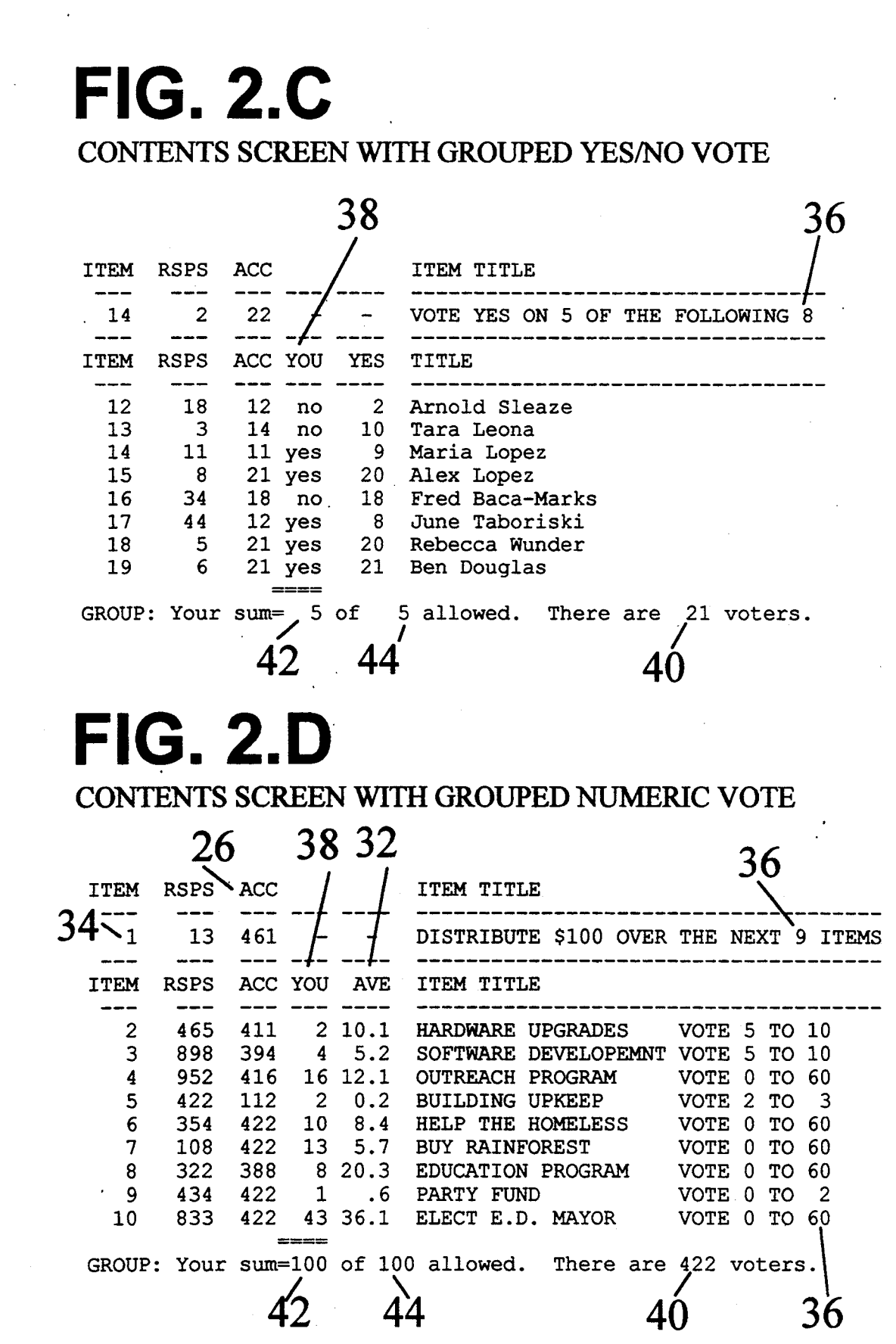

FIG. 2.C

CONTENTS SCREEN WITH GROUPED YES/NO VOTE

```
                          38                                  36
ITEM  RSPS  ACC           ITEM TITLE
---   ---   --- --- ----  ----------------------------------
 14     2    22   -    -  VOTE YES ON 5 OF THE FOLLOWING 8
---   ---   --- --- ----  ----------------------------------
ITEM  RSPS  ACC YOU  YES  TITLE
---   ---   --- --- ----  ----------------------------------
 12    18    12  no    2  Arnold Sleaze
 13     3    14  no   10  Tara Leona
 14    11    11 yes    9  Maria Lopez
 15     8    21 yes   20  Alex Lopez
 16    34    18  no   18  Fred Baca-Marks
 17    44    12 yes    8  June Taboriski
 18     5    21 yes   20  Rebecca Wunder
 19     6    21 yes   21  Ben Douglas
                ====
GROUP: Your sum= 5 of  5 allowed.  There are 21 voters.
             42   44                        40
```

FIG. 2.D

CONTENTS SCREEN WITH GROUPED NUMERIC VOTE

```
      26        38  32                                 36
ITEM  RSPS  ACC             ITEM TITLE
---   ---   ---  ---  ---   ----------------------------------------
34  1   13   461   -    -   DISTRIBUTE $100 OVER THE NEXT 9 ITEMS
---   ---   ---  ---  ---   ----------------------------------------
ITEM  RSPS  ACC  YOU  AVE   ITEM TITLE
---   ---   ---  ---  ----  ----------------------------------------
  2   465   411    2  10.1  HARDWARE UPGRADES     VOTE 5 TO 10
  3   898   394    4   5.2  SOFTWARE DEVELOPEMNT  VOTE 5 TO 10
  4   952   416   16  12.1  OUTREACH PROGRAM      VOTE 0 TO 60
  5   422   112    2   0.2  BUILDING UPKEEP       VOTE 2 TO  3
  6   354   422   10   8.4  HELP THE HOMELESS     VOTE 0 TO 60
  7   108   422   13   5.7  BUY RAINFOREST        VOTE 0 TO 60
  8   322   388    8  20.3  EDUCATION PROGRAM     VOTE 0 TO 60
  9   434   422    1    .6  PARTY FUND            VOTE 0 TO  2
 10   833   422   43  36.1  ELECT E.D. MAYOR      VOTE 0 TO 60
                 ====
GROUP: Your sum=100 of 100 allowed.  There are 422 voters.
               42     44                       40        36
```

FIG. 3

DATA INTENSIVE MENU

Please enter:

48 S - to (S)ee how you voted on this item.

50 W - to receive (W)ho voted statistics.

52 H - to receive (H)ow voted statistics.

54 R - to (R)emove your vote on this item.

FIG. 4.A
TWO-PROCESS ARCHITECTURE
(PRIOR ART)
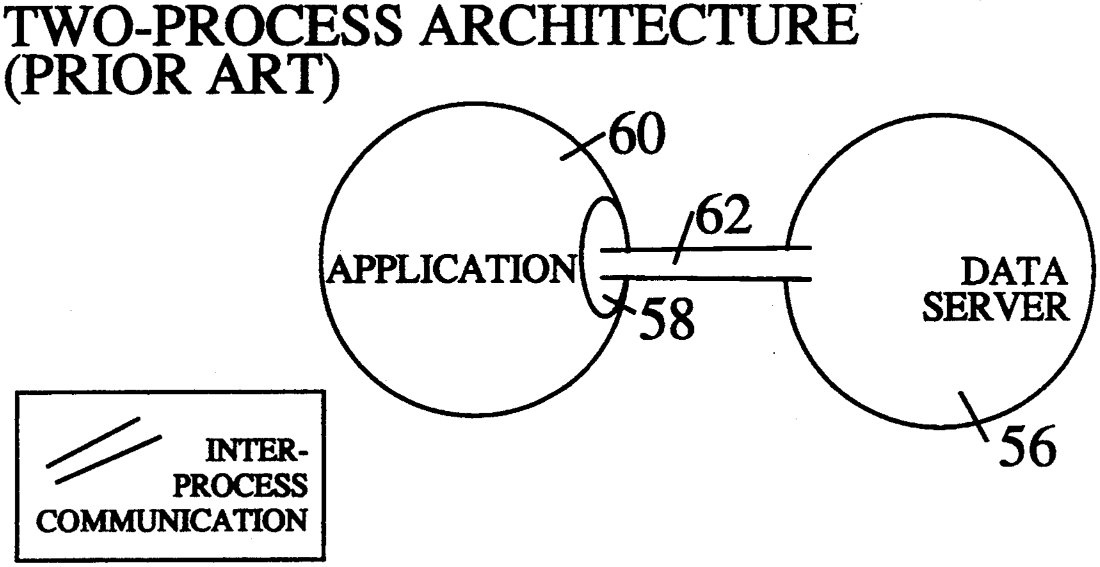
FIG. 4.B
SIMULTANEOUS PROCESSES
(PRIOR ART)
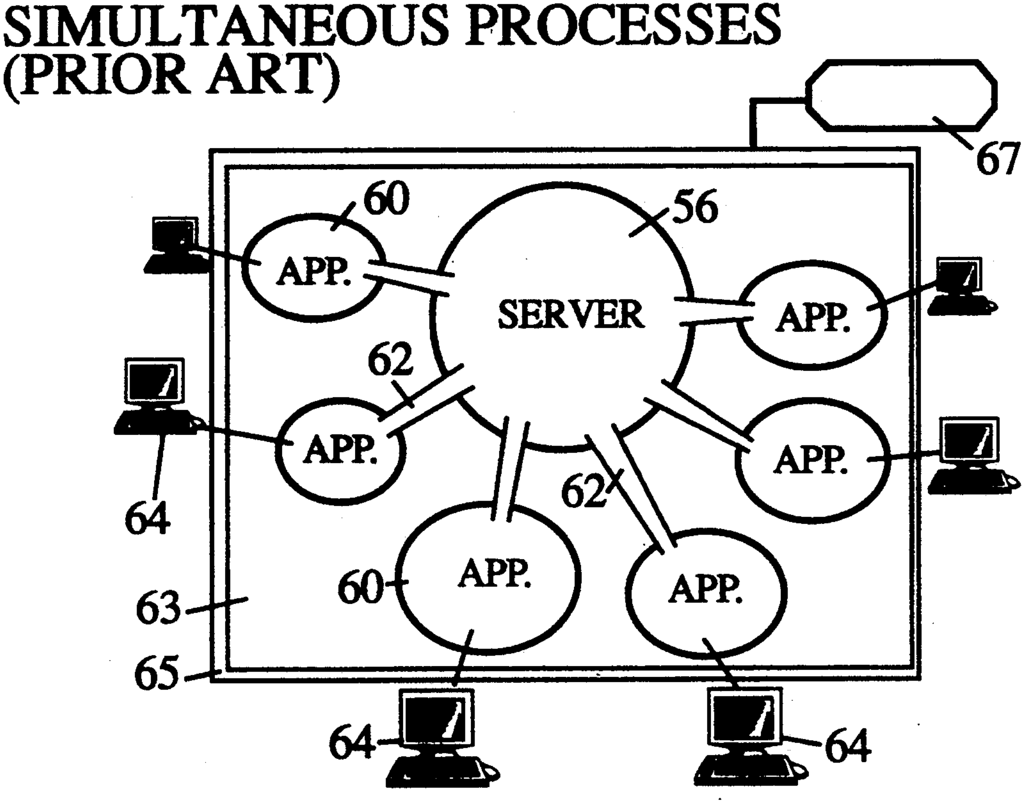

OVERALL ARCHITECTURE OF SERVER

FIG.6.A
MAILBOX CLASS CATEGORY
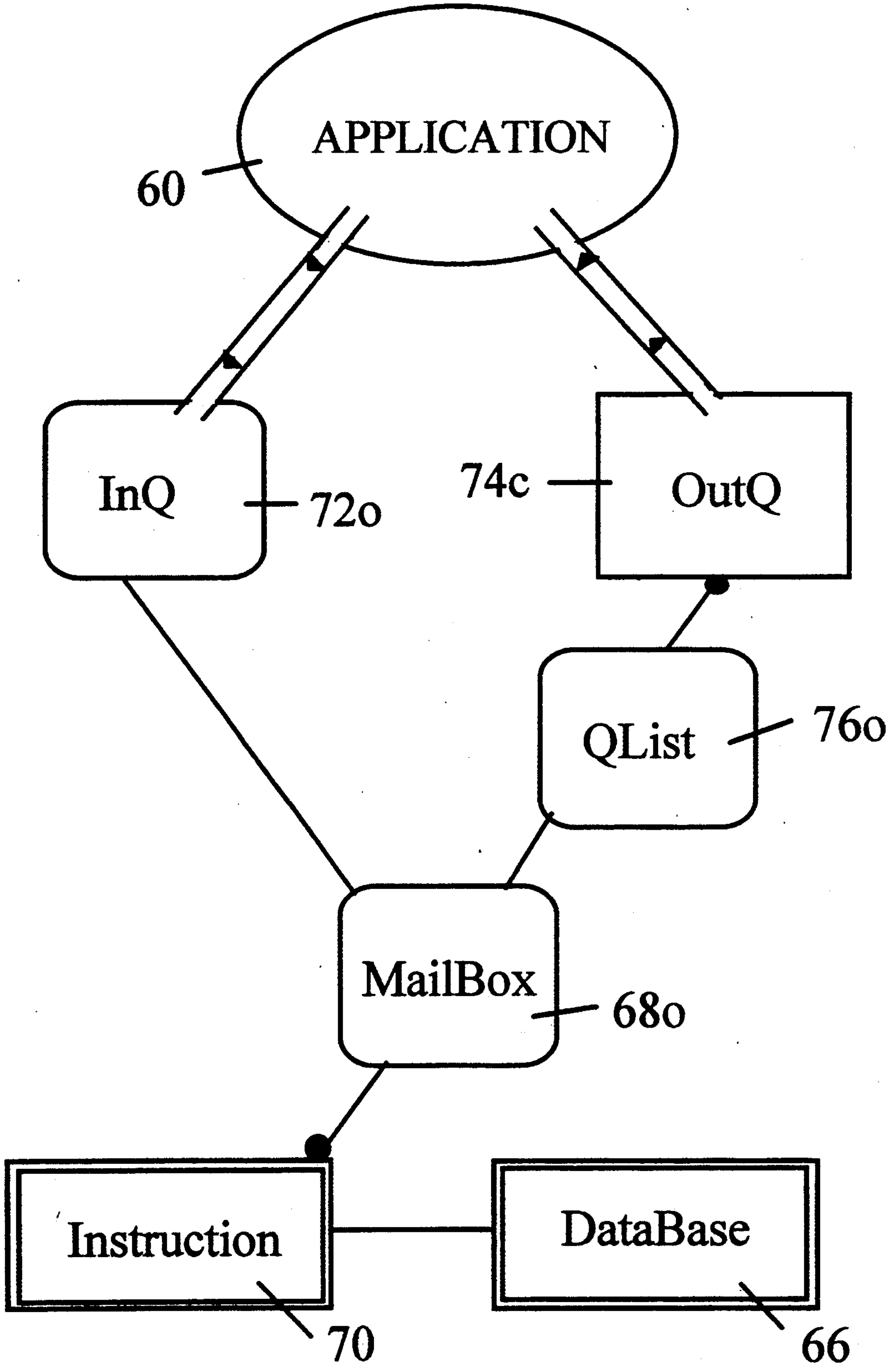

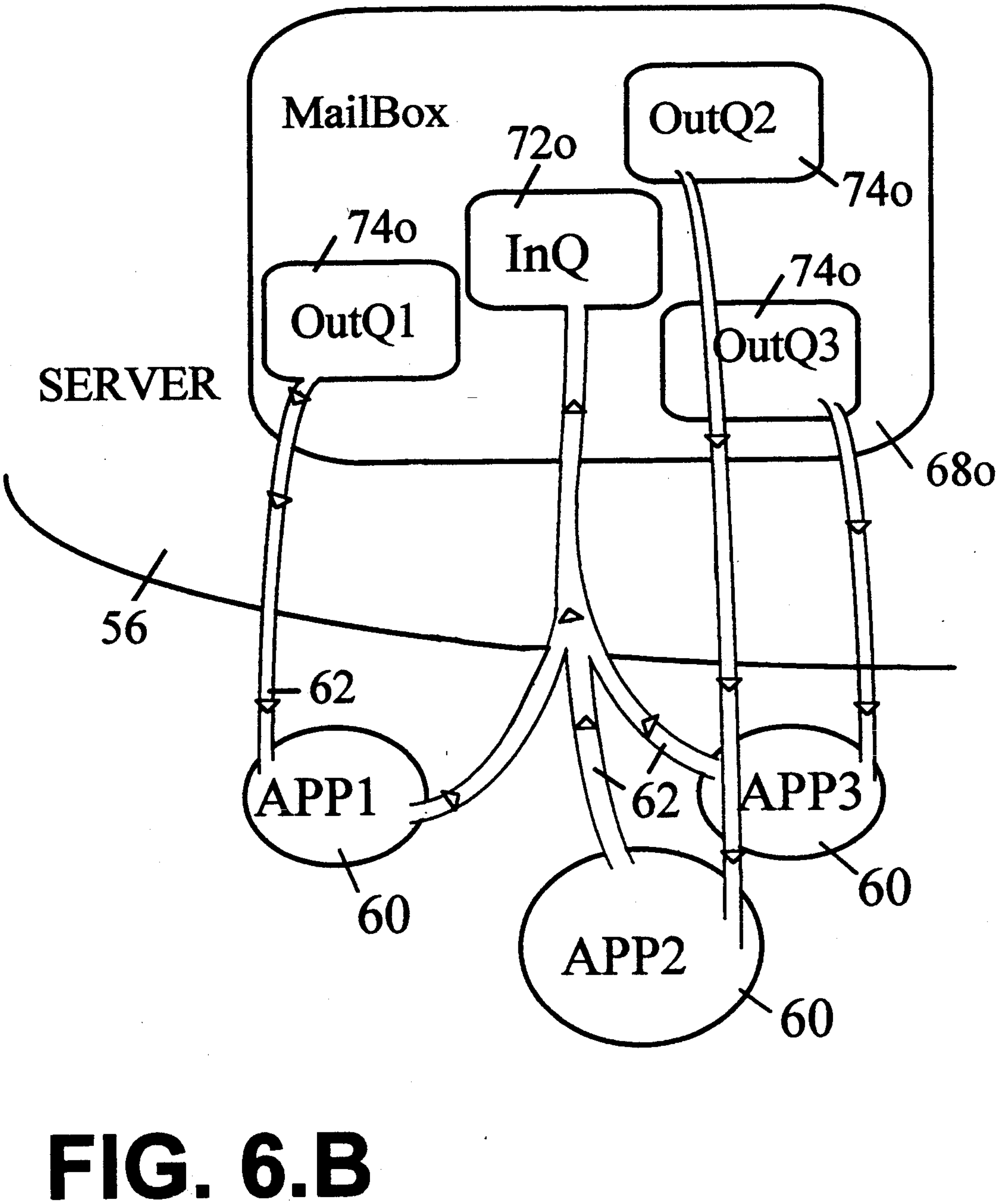
FIG. 6.B
InterProcess Communication Channels

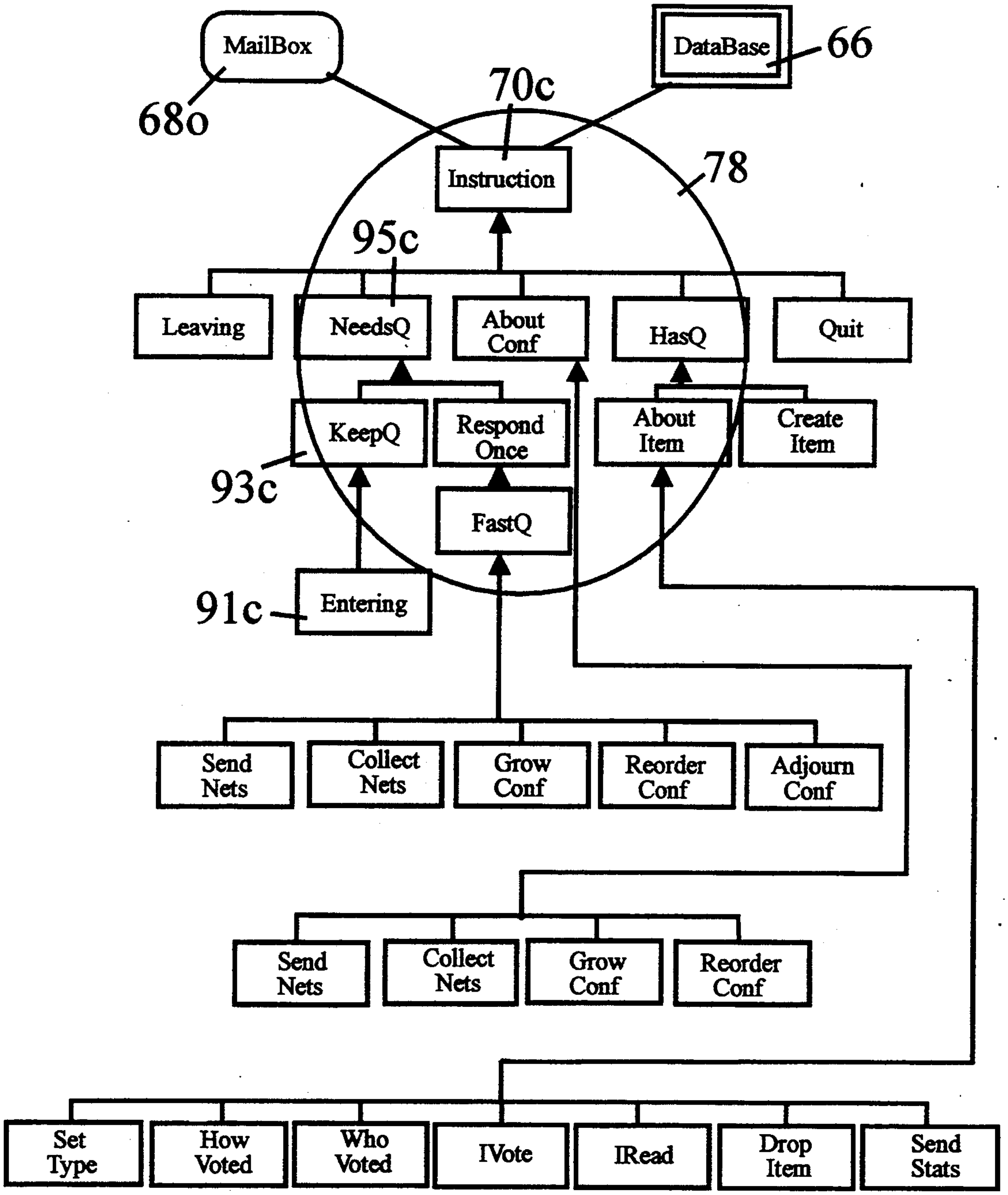
FIG. 7 Instruction CLASS CATEGORY

DataBase CLASS CATEGORY

Item CLASS CATEGORY

DENSE PACKING OF VOTE DATA

THE EXECUTION OF A REQUEST

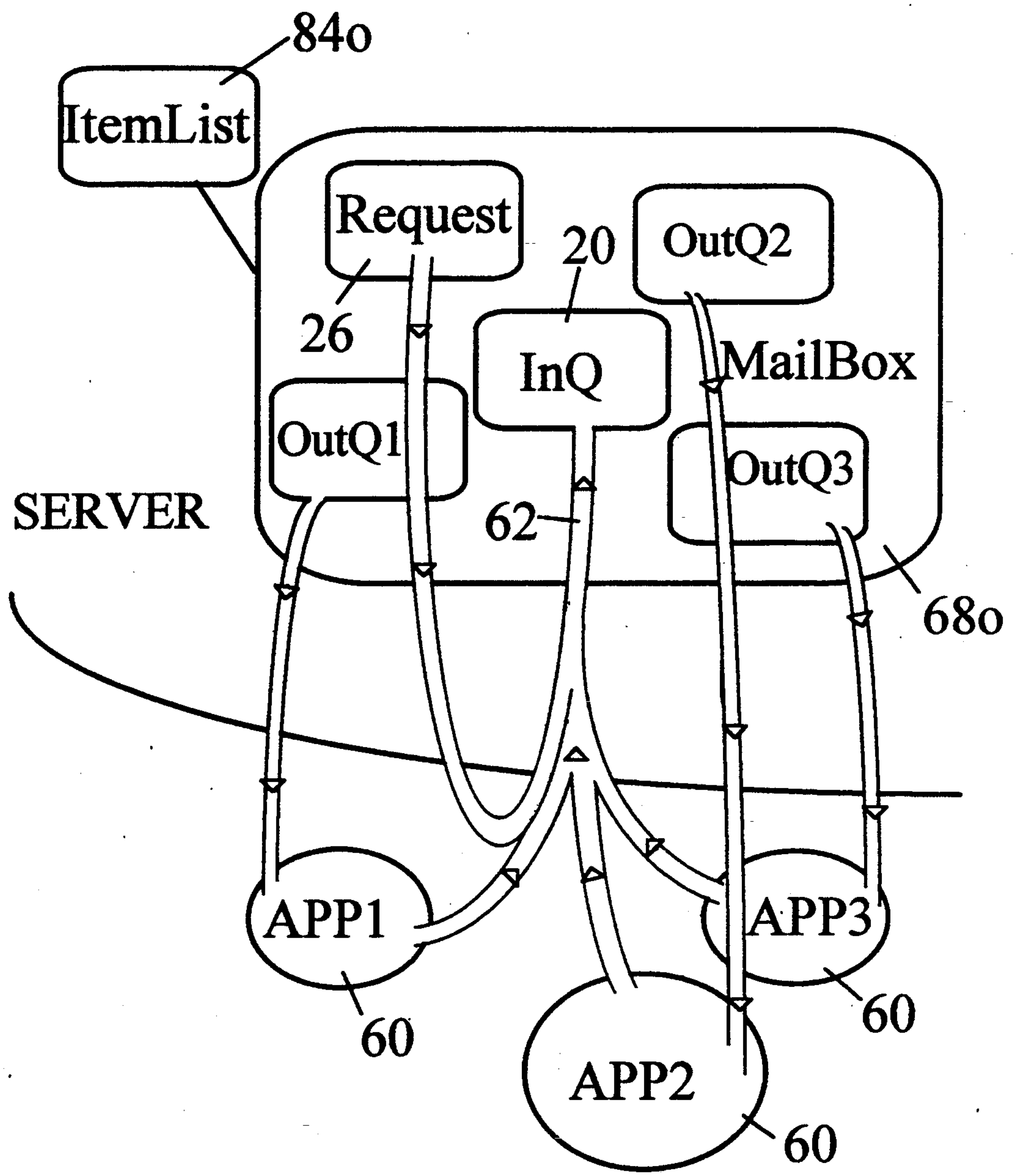
FIG. 12 THE EMERGENCE AND POSTPONING OF A GROOMING REQUEST

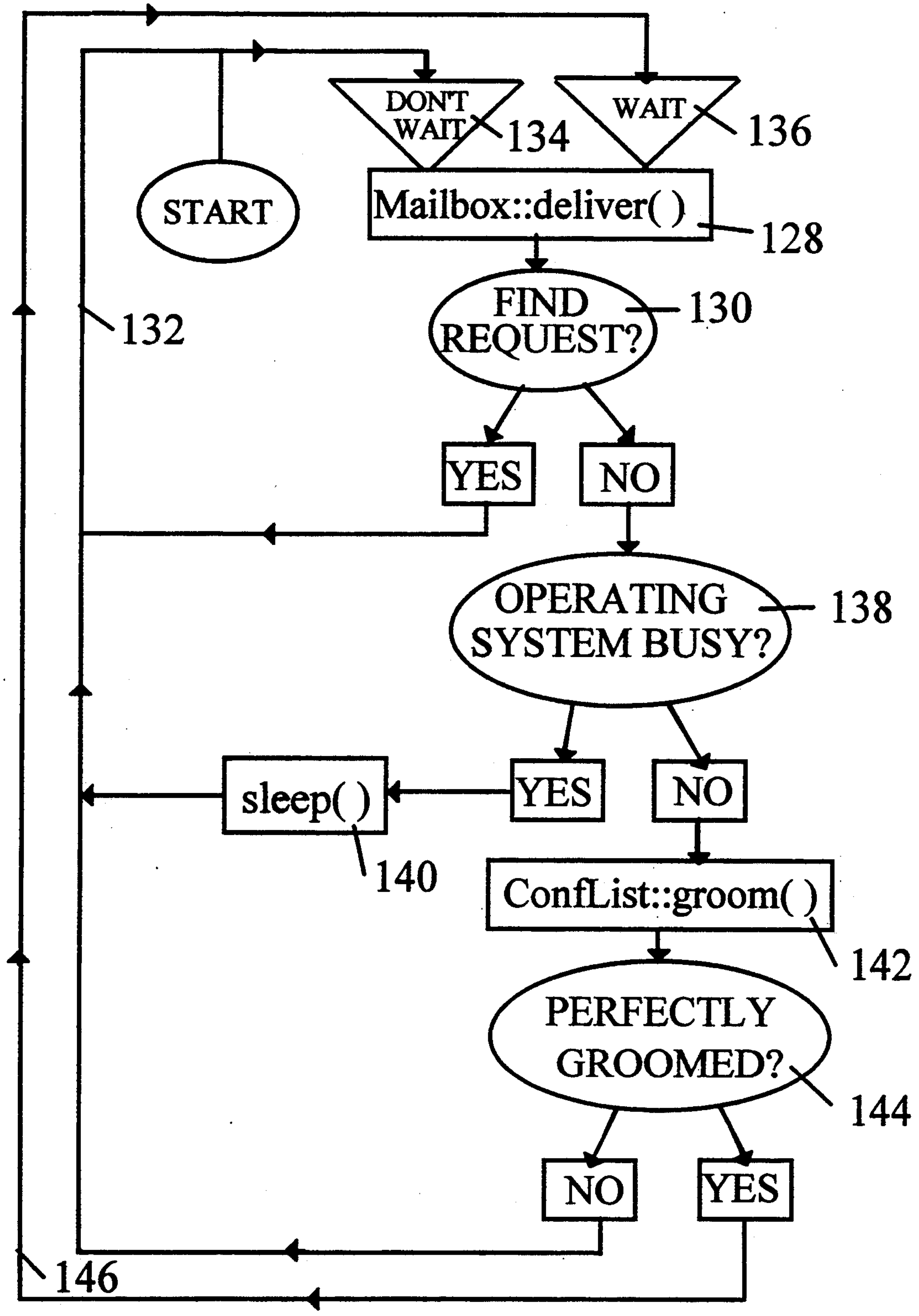
FIG. 13 MAIN CONTROLLING FUNCTION

SPECIALIZED DATA MANAGEMENT METHOD

BACKGROUND

1. Field of Invention

This invention relates to a method of data management, and more particularly, to a method of data management wherein the characteristics of the data elements being collected are known. The exemplary embodiment of this method is a vote data management system.

2. Description of Prior Art

Data management technology exists because the computer source code for all data-intensive computer applications can be organized into three quite distinct modules: the user-interface functions, the application functions, and the data-serving functions. Conventional data management systems capitalize on this natural organization by creating a generalized data management system that can be used in a wide variety of applications.

These generalized data management systems present the application programmer with an extension to her programming language that provides the data-serving functions. The application programmer calls these functions from inside the application code. This process is called embedding.

However, embedded generalized data management systems are inherently inefficient because, as these programs run, the specific data must be transformed into a generalized format for storage and transformed again, back to the natural format, on retrieval. Storing the data in the generalized, unnatural, format almost always takes much more storage space than storing them in their natural format.

In addition, generalized data management systems can only supply the application programmer with low-level data-serving functions, like "save_record" and "fetch_record". The programmer must deal with the complex task of transforming the specific data to fit a generalized record format.

This task is accomplished by 1) writing the code to fill up and unfill the records, and 2) setting up schema, or maps of the record formats. Because these things must be done before the computer program is compiled, the resulting application is incapable of run-time flexibility in its schema definitions. Indeed, in conventional data management art, it is understood (*Object Data Management,* page 215, by R. G. G. Cattell, Addison-Wesley Publishing Company, 1991) that no automatic and satisfactory schema-evolution capability is possible because generalization to a variety of data types necessitates too many possible transformations of the schema and the data.

In the software industry, there are (at least) several programs developed in response to each computable problem. For example, several software companies make warehousing applications. Sometimes the several programs developed for one problem rely on the same data management system. This means that the task of generalizing the specific data must be duplicated by each developer. So, while using a generalized data management system circumvents the need for some duplicate code, it also creates a need for other duplicate code.

Worse yet, the work of evolving the schema, if it is possible at all, must be done by personnel at the end-user site, with the help of utility programs supplied by the application programmer.

The exemplary embodiment of this invention is a data management system for maintaining vote data for groupware systems. Groupware is the name given to any computer hardware/software system that helps people cooperate in some way. The most common form of groupware, and the form to which the exemplary embodiment of this invention is most immediately applicable, is the computer conferencing system, sometimes called a bulletin-board. These conferencing systems invite an on-line community to post and read information in an organized way.

In groupware art, there are almost no methods for collecting votes from an on-line community. One makeshift vote-keeping method is outlined in the booklet, *Customizing the Caucus(TM) User Interface* (Camber-Roth, Troy, N.Y., November, 1990).

The Caucus conferencing software works with the Unix operating system. As with most conferencing systems, the text posted to the system by its users is organized as an outline is organized. The major categories under discussion are called conferences. Each conference has a title. A user starts a discussion by creating an "item of discussion". To do so, the user is required to enter text and a title for the new item. The titles for these items are listed on an "contents" screen.

An example of a prior-art contents screen is shown in FIG. 1. The list of item titles is under the "ITEM TITLE" heading 20.

Users can continue the discussion on a particular item by adding a message to the item. The number of messages added to each item is listed under the "RESPONSES" column 22 on the contents screen. The item number is listed under the "ITEM #" column 24.

The instructions recommend that votes be collected at the item level by using the messages as ballots: to vote "yes", the user adds a message with "YES" in the text body; to vote "no", the user adds a message with "NO" in the text body.

The votes are tallied and reported by a utility program that is run by the end-users from inside the conferencing program.

The utility program searches the messages for the "YES" and "NO" strings, counts the number of each, and reports the results to the user. This method, although clever, cheap, and useful, is inflexible, slow, and cumbersome to use. It does not allow numeric or grouped votes (as explained below), does not provide opportunity for collating votes from different computer sites, and does not allow users to query the vote data, to change their votes, or to place restrictions on the vote values or the manner in which the votes are collected, tabulated, and/or reported.

Many of the deficiencies of the Caucus method can be remedied, according to current art, by embedding a generalized data management system into the groupware's source code. However, as described above, the embedding task is somewhat large and difficult and the resulting system would either require much more storage space and processing time, or require constant human intervention to keep the schema up-to-date.

Objects and Advantages

The present invention, a specialized data management method, provides a high-level language extension for the application programmer. In the case of the exemplary embodiment, the new language elements are natural requests like "i_vote" or "send_statistics_on_item" instead of the low-level record-centered requests of generalized systems. Therefore, most of the work of application development is accomplished by the specialized data management system and only the user-interface and the connections to it must be developed.

In the specialized data management method, schema-evolution is handled by the data management system and by the end-user. However, the end-user is not aware that he is causing schema-evolution; his mundane requests and commands trigger the complex data management tasks transparently.

Because data are stored in a natural format for the particular data type, they are stored optimally compactly. Also they are arranged so that data retrieval is as fast as possible; i.e., they are optimally clustered. In order to affect these optimal arrangements, a certain amount of data grooming, i.e. reordering and pruning, takes place. The grooming tasks are handled by the invention without conscious human intervention. Additionally, these tasks are undertaken, as much as possible, only when the computer system is otherwise idle.

Besides the advantages that the specialized data management system provides over a generalized data management system, there are advantages that the exemplary embodiment, the vote-keeper, provides over the Caucus vote-tallying method. The vote-keeper, like the Caucus method, allows any user to initiate a vote question. The vote-keeper also allows vote statistics to be presented on the contents screen, a huge user-interface advantage. While the Caucus method only allows one type of vote, the vote-keeper supports a myriad of vote types and options.

SUMMARY OF THE INVENTION

A method of specialized data management is provided in which the specialization allows distribution of the schema over the specialized objects so that schema-evolution is handled transparently by the end-user at run time, so that the data are stored with optimal compactness, so that data can be more efficiently clustered, so that self-grooming rules can be applied to the data, and so that the database management system can supply a higher level of interface to the application programmer.

The specialized data management method executes the data-grooming activities, as much as possible, when the computer's central processing unit is relatively idle.

DRAWING FIGURES

In the drawings, closely related figures have the same numeral but different alphabetic suffixes.

Figure 8:
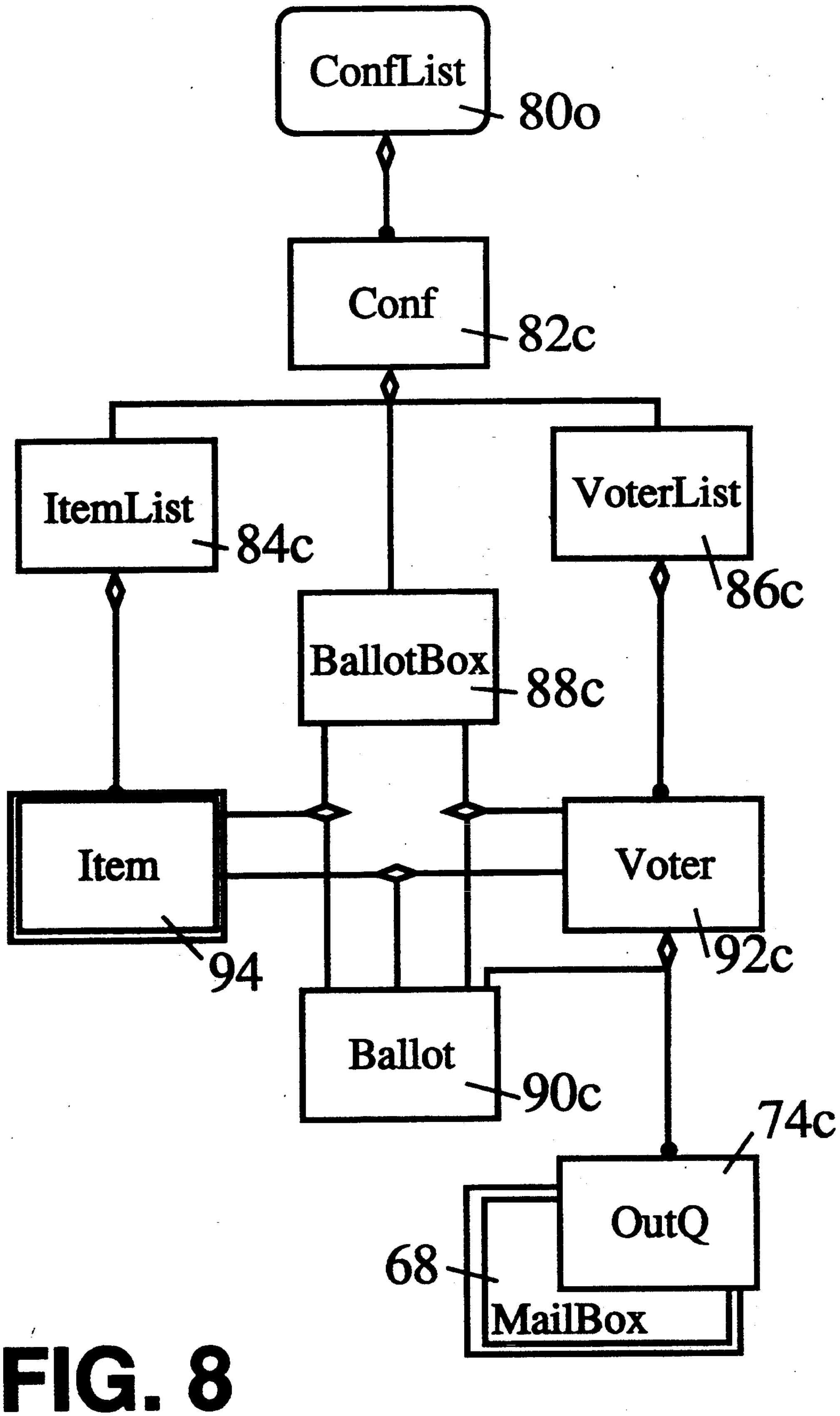
Figure 9:
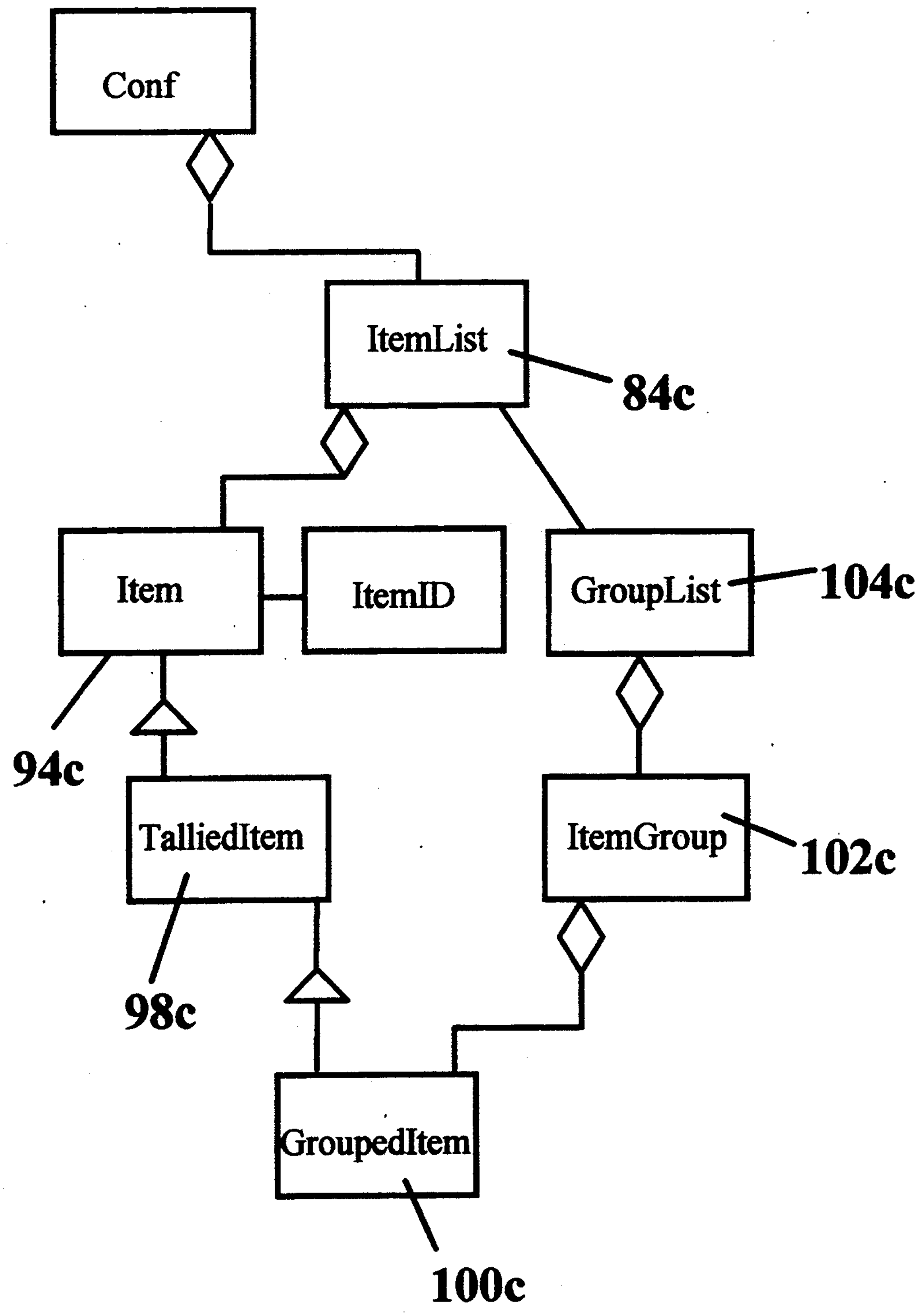
Figure 10:
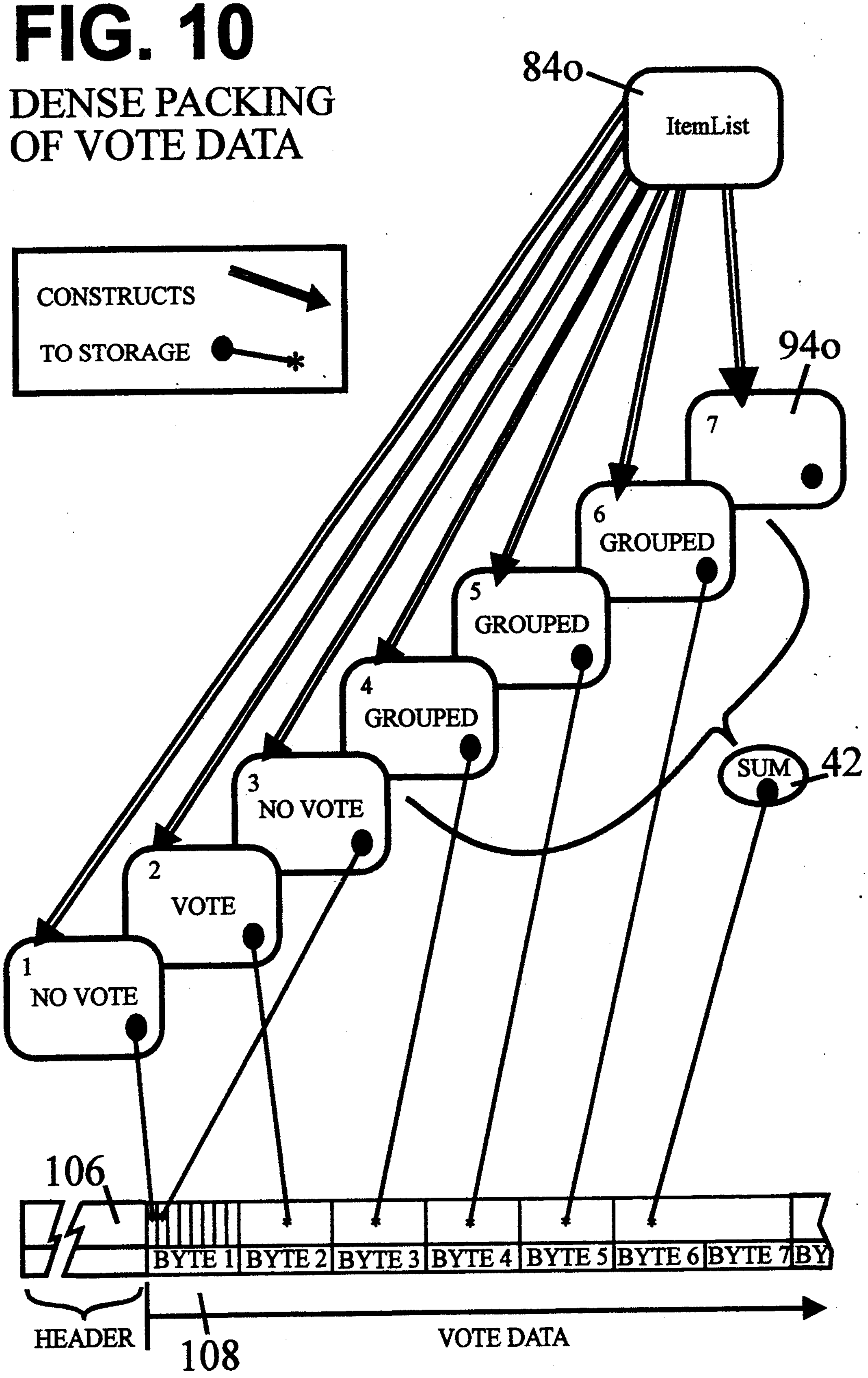
Figure 11:
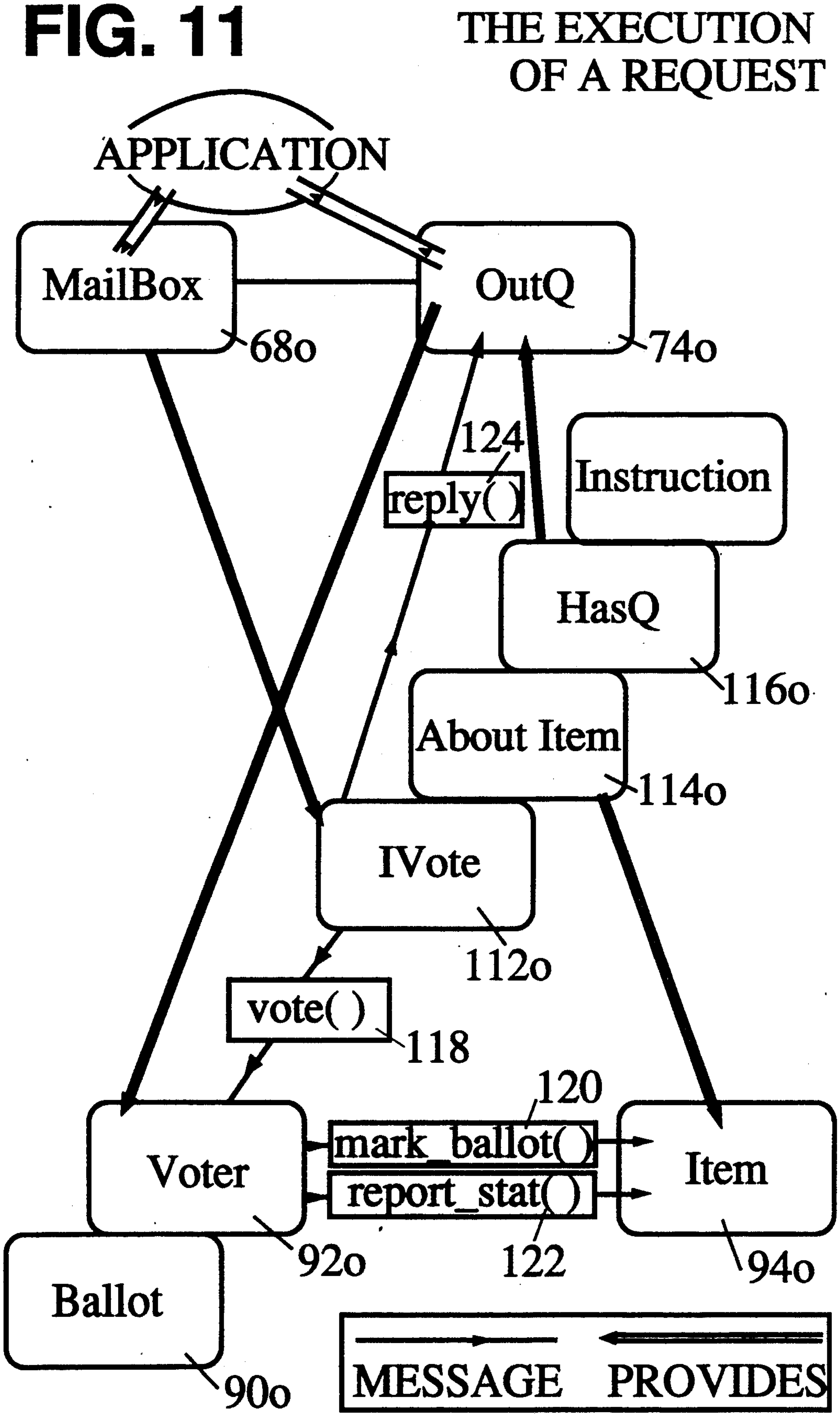

FIG. 1 An Example of a Prior-Art Contents Screen
FIG. 2.A Contents Screen with Yes/No Vote
FIG. 2.B Contents Screen with Numeric Vote
FIG. 2.C Contents Screen with Grouped Yes/No Vote
FIG. 2.D Contents Screen With Grouped Numeric Vote
FIG. 3 Data-Intensive Menu
FIG. 4.A (prior art) Two-Process Architecture
FIG. 4.B (prior art) Simultaneous Processes
FIG. 5 Overall Architecture Of the Server
FIG. 6.A MailBox Class Category
FIG. 6.B InterProcess Communication Channels
FIG. 7 Instruction Class Category
FIG. 8 DataBase Class Category
FIG. 9 Item Class Category
FIG. 10 Dense Packing of Vote Data
FIG. 11 The Execution of a Request
FIG. 12 The Emergence and Postponing of a Grooming Request
FIG. 13 Main Controlling Function

Reference Numerals in Drawings

In the drawings a class and an object of that class are identified by the same reference numeral but have a different letter appended to indicate whether the particular component of the diagram represents a class or an object. If the component represents a class, the numeral is appended with 'c'; if the component represents an object, the numeral is appended with 'o'. Class categories bearing the same name as a class are also identified with the same numeral as the class but with no appended letter.

| Reference Numeral | First Appears in FIG. # | Refers to |
|---|---|---|
| 20 | 1 | ITEM TITAL column |
| 22 | 1 | RESPONSES column |
| 24 | 1 | ITEM number column |
| 26 | 2.A | ACC column-number of accessers |
| 28 | 2.A | VTR column-number of voters |
| 30 | 2.A | YES column-number of yes votes received |
| 32 | 2.B | AVE column-average vote |
| 34 | 2.B | no vote item |
| 36 | 2.C | instruction for a group of items |
| 38 | 2.C | YOU column-the user's vote |
| 40 | 2.C | number of voters in a group of items |
| 42 | 2.C | sum of the user's votes on a group |
| 44 | 2.C | limit of the sum of a user's votes on a group |
| 46 | 2.D | enforced vote limits |
| 48 | 3 | "See" your vote option |
| 50 | 3 | "Who voted" option |
| 52 | 3 | "How voted" option |
| 54 | 3 | "Remove your vote" option |
| 56 | 4.A | data-server |
| 58 | 4.A | embedded programming language extension |
| 60 | 4.A | application |
| 62 | 4.A | InterProcess Communication |
| 64 | 4.B | end-user terminal |
| 65 | 4.B | central processing unit |
| 66 | 5 | DataBase |
| 67 | 4.B | information storage device |
| 68 | 5 | MailBox |
| 70 | 5 | Instruction |
| 72 | 6 | InQ-request queue |
| 74 | 6 | OutQ-return message queue |
| 76 | 6 | QList |
| 78 | 7 | abstract instruction classes |
| 80 | 8 | ConfList |
| 82 | 8 | Conf |
| 84 | 8 | ItemList |
| 86 | 8 | VoterList |
| 88 | 8 | BallotBox |
| 90 | 8 | Ballot |
| 91 | 7 | Entering instruction |
| 92 | 8 | Voter |
| 93 | 7 | KeepQ instruction |
| 94 | 8 | Item |
| 95 | 7 | NeedsQ instruction |
| 96 | 9 | ItemID |
| 98 | 9 | TalliedItem |
| 100 | 9 | GroupedItem |
| 102 | 9 | ItemGroup |
| 104 | 9 | GroupList |
| 106 | 10 | ballot header |
| 108 | 10 | ballot vote data |
| 112 | 11 | IVote |
| 114 | 11 | About Item |
| 116 | 11 | HasQ |
| 118 | 11 | vote() message |
| 120 | 11 | mark_ballots() message |

-continued

| Reference Numeral | First Appears in FIG. # | Refers to |
|---|---|---|
| 122 | 11 | report_stat() message |
| 124 | 11 | reply() message |
| 126 | 12 | Request |
| 128 | 13 | MailBox::deliver() |
| 130 | 13 | find request? |
| 132 | 13 | inner loop |
| 134 | 13 | <DON'T WAIT> entry |
| 136 | 13 | <WAIT> entry |
| 138 | 13 | operating system busy? |
| 140 | 13 | sleep() |
| 142 | 13 | ConfList::groom() |
| 144 | 13 | perfectly groomed? |
| 146 | 13 | outer loop |

DETAILED EXPLANATION OF AN EXEMPLARY EMBODIMENT OF THE INVENTION

An exemplary embodiment of the specialized data management system is a data management system specialized to vote data generated by a groupware system as described above. The system will be referred to as the vote-keeper.

The vote-keeper was developed on Interactive Unix V.3.2 but can be used on any Unix platform. With some fairly minor adjustments, it can be used on any multiuser computer system and embedded into any groupware application.

FIGS. 2 and 3 detail the possible results of using the vote-keeper in a conferencing system. These are explained in the section, The Vote-Keeper in Use.

The next section, Extension to A Programming Language, lists the vote-keeper's user-interface as seen by the application programmer.

FIG. 4 is a diagrammatical representation of the overall architecture of the vote-keeper's source code. FIGS. 5, 6.A, 7, 8, and 9 are diagrams of the architecture of smaller pieces of the source code. The other FIGS., 6.B, 10, 11, 12, and 13, each diagram some important detail of the system.

The Vote-Keeper In Use—FIGS. 2 and 3

When the vote-keeper is embedded into a conferencing system like the system explained in Description of Prior Art, above, the most obvious change will be in the appearance of the contents screen.

FIG. 2.A shows a contents screen with the vote-keeper embedded and with a simple YES/NO vote requested. As in a conference without the vote-keeper, there is a list of item titles 20 and a column that shows the number of messages that have been added to the item, marked RSPS 22. The vote-keeper provides support for the three new fields in FIG. 2.A: ACC 26, showing the number of users who have accessed the item; VTR 28, showing the number of users who have voted on the item; and YES 30, showing the number of users who have voted 'YES' on the item.

FIG. 2.B shows a contents screen with a numeric vote, also supported by the vote-keeper. Here the YES column is replaced by an AVE column 32. The AVE column reports the average vote given to the item by the community.

Item 4 in the example of FIG. 2.B 34 serves as an instruction item and there is no vote taken on item 4 itself. The vote-keeper allows plain, unvoted items and supports the reporting of the number of users who have accessed the unvoted item 26.

The vote-keeper also supports the distributing of YES votes, by the end-users, over a set of items. FIG. 2.C is an example of such distributing where the vote question is "VOTE YES ON 5 OF THE FOLLOWING 8" 36. In FIG. 2.C, the YOU column 38 replaces the VTR column 28 of FIG. 2.A). Each of the items in a group has the same number of voters. That number is shown at the bottom of the group in the example 40. Also shown at the bottom of the group is the number of YESes this voter has used 42 and how many are available 44.

The vote-keeper supports, but is not limited to supporting, another vote configuration whereby numeric votes are distributed by the voter over a group of items. FIG. 2.D shows an example contents screen resulting from this configuration. In FIG. 2.D, as in FIG. 2.B, there is a plain item with no vote taken that provides instructions for the group of items 34. In the grouped numeric example of FIG. 2.D the vote question is "DISTRIBUTE $100 OVER THE NEXT 9 ITEMS" 46. The column headings for this example are: ACC 26 showing the number of users who have accessed the item; YOU 38 showing the vote that the current voter has given the item; and AVE 32 showing the average vote that the item has received. The number of voters 40 and the sum of the current user's votes on the group 42 and the total number of vote points that the user is allowed to distribute over the group 44 are shown at the bottom of the group.

The vote-keeper supports the-setting and enforcing of limits on the acceptable votes for each item 46.

The vote-keeper provides support for data intensive menu items similar to those shown shown in FIG. 3. The menu choices supported by the vote- keeper include but are not limited to: a "See" 48 command that allows each voter to see her own votes, enhancing the system's security; a "Who voted" 50 command whereby users can query the data on a item to find who has given this item a specific vote, i.e., "Who has voted 'yes' on this item?" or "Who has voted greater than 8 on this item?"; a "How voted" 52 command whereby a user can know how another user voted on a specific item. The current embodiment of the vote-keeper also supports a user's capability to remove her vote from an item 54, to change his vote, and to remove her participation from the conference.

The current vote-keeper supports, but is not limited to supporting, three vote permission types: "public", "if-voted", and "private". Votes on items can be designated "public", whereby voters can see each other's votes, and all the menu options described above are available. Votes on items can be designated "if-voted", whereby voters can see if other members of the on-line community have voted but they cannot see how the other members voted. And, of course, votes can be "private", whereby only the statistics listed on the contents screen are available.

The vote-keeper also supports, but is not limited to supporting three vote states for each voted-on item: HIDDEN, whereby votes are accepted but statistics about the vote are not available; OPEN, whereby votes are accepted and the statistics are available; and CLOSED, whereby votes are not accepted and the statistics about the vote are available.

The vote-keeper can also be embedded so that several votes are taken on each item, for example: one vote to judge the group's acceptance of the idea expressed, and one vote to judge the expression of the idea. When the expression is being judged, the resulting score can be used to determine whether or not this item should be deleted from the conference.

This is a method of democratically pruning or censoring the material in the groupware application.

Although the embodiment presented here is a vote-keeper embedded into a conventional conferencing system, the vote-keeper can be embedded anywhere that a vote is useful. Additionally, instead of a vote-keeper, the method can be used to build a data management system for other types of specialized data.

Extension to A Programming Language

The vote-keeper's user-interface, like the user-interface for most data management systems, is an extension to a programming language. The user is the application programmer and the interface he sees is the list of new language elements. In the case of the vote-keeper, the new C routines are written in the C programming language. Most computer languages have provisions for calling C functions so most languages can be extended to include the vote-keeper by linking in the new C library and calling the C routines.

Here the C calls provided by the vote-keeper are listed along with their synopses which indicate exactly how to use the calls in the application program.

The new C and C++ language elements provided by the vote-keeper fall into three general categories: administrator functions, facilitator functions, and voter functions. Many of these functions return OKorNOT, an enumerated type.

Administrator Functions

Administrator functions are called when creating, adjourning, checking, and dropping conferences, and when statistics are sent or received from other computers. Dropping a voter from a conference and stopping the server are also considered administrative functions.

```
OKorNOT adjournevotefor(conf_name)
        char * conf_name;
    {
        Here, we take the conference out of memory for
        continuing another time. It will be reconvened the
        first time someone enters it with a call to
        i_am_entering(), below.
    }
OKorNOT check_conf(conf_name)
        char * conf_name;
    {
        The named conference is checked. The ballots are re-
        tallied and the item totals are checked. Discrepancies
        are fixed, if possible, and reported in evote.log, the
        log file for the vote-keeper.
    }
OKorNOT collect_net_info(conf_name, iid, from_file)
        char * conf_name;
        ItemID * iid;
        FILE * from_file;
    {
        This function collects, from "from_file" , a particular
        item's vote configuration information gathered from
        another computer.
    }
OKorNOT collect_net_stats(conf_name, iid, from_file)
        char * conf_name;
        ItemID * iid;
```

-continued

```
        FILE * from_file;,
    {
        This function collects new statistics gathered from
        another computer about the item from "from_file".
    }
OKorNOT create_evote_for(conf_name)
        char * conf_name;
    {
        This function starts a new conference.
    }
OKorNOT drop_conf(conf_name)
        char * conf_name;
    {
        Drops the conf from the database, making backup files.
    }
OKorNOT drop_voter(conf_name, uid_to_drop)
        char * conf_name;
        int uid_to_drop;
    {
        This function drops the named voter from the conf. The
        voter's votes are taken out of the statistics for all
        items in the conf.
    }
OKorNOT send_net_info(conf_name, iid, to_file)
        char * conf_name;
        ItemID * iid;
        FILE * to_file;
    {
        This function stores the vote configuration information
        about the item in "to_file".
    }
OKorNOT send_net_stats(conf_name, iid, to_file)
        char * conf_name;
        ItemID * iid;
        FILE * to_file;
    {
        This function stores the statistics about the item in
        "to_file".
    }
OKorNOT send_quit()
    {
        Tells the server to save everything and quit.
    }
```

Facilitator Functions

Facilitator functions deal with setting up and managing the votes.

```
OKorNOT evote_new_item(iid, evote_flag, max, min, priv_type,
        group_flag, more_to_come, sum_limit )
        ItemID *iid;
        char evote_flag, group_flag;
        unsigned short max, min;
        PRIV_TYPE priv_type;
        short more_to_come, sum_limit;
    {
        This is called to create a new item, whether it is
        tallied, plain, or grouped. When creating a plain or
        tallied item, the unused arguments are ignored.
    }
OKorNOT close_vote(status)
        CSTATUS *status;
    {
        This changes the status to show that the vote is closed.
        The status pointer that is passed in should point to the
        status variable kept in the item's data structure.
    }
OKorNOT drop_item(iid)
        ItemID* iid;
    {
        Drops the item from the conf.
    }
OKorNOT hide_vote(status)
        CSTATUS *status;
    {
        Hides the vote tally on the item.
    }
OKorNOT open_vote(status)
```

-continued

```
        CSTATUS *status;
{
    Reopens the vote on the item.
}
```

Voter Functions

Voter functions log the user's activity, accept the user's vote, and return various statistics.

```
char* get_stats(iid)
        ItemID* iid;
{
    Returns a string containing the statistics to print for
    the item requested.
}
short how_voted(iid, priv_type, pwname)
        ItemID *iid;
        PRIV_TYPE priv_type;
        char *pwname;
{
    Returns the vote for the given pwname. If pwname ==
    NULL, the caller's vote is returned. If not, the vote
    is returned only if the priv_type allows it.
}
OKorNOT i_am_entering(conf_name, no_notes_in)
        char *conf_name;
        short no_notes_in;
{
    Alerts the server that there is activity here. The
    server readies statistics for sending back. no_notes_in
    is the number of items currently in the conference.
}
void i_am_leaving()
{
    Informs the server that this voter is leaving so that
    the server can make a little space by storing this
    voter's ballot.
}
OKorNOT i_just_read(iid)
        ItemID *iid;
{
    Informs the server that the user has read the item. No
    acknowledgement given.
}
OKorNOT i_vote(iid, status, max, min, group_flag, vote)
        ItemID* iid;
        CSTATUS status;
        unsigned short max, min;
        char group_flag;
        short vote;
{
    Accepts, checks and acknowledges vote to stdout.
}
OKorNOT who_voted(iid, priv_type, instruction)
        ItemID * iid;
        PRIV_TYPE priv_type;
        char *instruction;
{
    Asks a question like "Who voted less than 3" on the
    item. "instruction" is a character string that contains
    the meat of the question, "<3", in this case. The
    server passes back a list of user-ids and this function
    translates them to login names and prints them to
    stdout.
}
```

Two-Process Architecture—FIGS. 4.A and 4.B

The vote-keeper uses a two-process architecture as is common in database management art and as is described in *Object Data Management,* supra. FIG. 4.A is a diagrammatic representation of the architecture for the vote-keeper. The data-serving process 56 is a daemon as described on page 301 of *Unix—The Complete Reference* by Stephen Coffin (Osborne McGraw-Hill, 1988). It runs as a background process without user intervention. The vote-keeper provides an extension to the C or C++ programming language in the form of a library of C routines 58 that are embedded into the application's source code 60, the conferencing system in the present example. The C routines communicate with the server through the InterProcess Communication facilities 62 provided by the operation system. The Unix InterProcess Communication facilities used in the exemplary embodiment are the message system calls, described in *Advanced Unix Programming* by Marc J. Rochkind, page 182 (Prentice-Hall, Inc., 1985).

Although the source code for the device uses a two-process architecture, in reality, when the vote-keeper is in use, many processes can be running simultaneously, as shown diagrammatically in FIG, 4.B. Each end-user runs and controls a separate process, executing a copy of the application program 60.

In the example, each of the processes running the application program 60 communicates with a single data-server process 56 running in the computer's background through InterProcess Communication 62. All of the application processes 60 as well as the data-server process 56 are executing under the control of the multi-process operating system 63 on the central processing unit 65. The data are stored on the information storage device 67.

On busy systems, however, this architecture is easily extended to run more than one data-server by specifying that the data for certain conferences be maintained by one server process while the data for other conferences be maintained by another server process.

Also, the architecture can be modified so that the application programs 60 run on separate computers as long as communication with the data-server process is maintained. In this case, the operating system can be a single process operating system.

InterProcess Communication Messages

The C routines listed above, when necessary, translate the request into an InterProcess Communication message and send the request to the vote-keeper's server program. The types of messages that the server program understands includes but is not limited to:

- ADJOURN_CONF—stores all data regarding the designated conference.
- CHECK_CONF—retallies all the votes and checks the stored results.
- COLLECT_NET_INFO—includes the items and vote configurations gathered from other computers.
- COLLECT_NET_STATS—includes statistics gathered from other computers.
- CREATE_CONF—adds a new conference to the database.
- CREATE_GROUPED_ITEM—adds a new grouped item to the database.
- CREATE_PLAIN_ITEM—adds a new unvoted item to the database.
- CREATE_TALLIED_ITEM—adds a new voted item to the database.
- DROP_CONF—removes a designated conference from the database.
- DROP_ITEM—removes a designated item from the database.
- DROP_VOTER—removes the data relating to a specified voter from the portion of the database relating to the specified conference.

ENTERING—copies a specified voter's data regarding a specified conference from disk into memory.

HOW_VOTED—answers a query about how a particular voter voted.

I_READ—registers a specified user as one who has accessed a specified item.

I_VOTE—registers a specified user as one who has voted a specified amount on a designated item.

LEAVING—stores a specified voter's data regarding a specified conference on disk and frees up computer memory.

QUIT—stores all data on disk and stops the server.

SEND_NET_INFO—returns the vote configuration about the specified item for sending to other computers.

SEND_NET_STATS—returns statistics about the specified item for sending to other computers.

SEND_STATS—returns a string of statistics for printing on the contents screen.

SET_TYPE—sets the vote status or the vote permission type for a specified item.

WHO_VOTED—answers a query about which voters voted in a particular manner on a specified item.

Overview of the Vote Server Program—FIG. 5

The vote-keeper's server program is object-oriented: the diagram notation and terminology used here is described in *Object-Oriented Modeling and Design* by James Rumbaugh et. al. (Prentice-Hall, Inc., 1991) with the addition that class categories, as defined in *Object Oriented Design with Applications,* by Grady Booch (The Benjamin/Cummings Publishing Company, Inc., 1991) are represented by double-lined rectangles.

The vote-keeper's server program consists of three class categories as shown diagrammatically in FIG. 5. The DataBase class category 66 actually manages the data. The MailBox class category 68 is responsible for incoming and outgoing InterProcess Communication 62 to the application processes 60.

When a MailBox object receives a request from an application process, it creates an appropriate Instruction object in the Instruction class category 70. The Instruction object coordinates the execution of the requested task by issuing requests to the appropriate objects in the DataBase class category and sending any required responses back to the application process through the MailBox. Each of these three major class categories is discussed in detail below.

The MailBox Class Category—FIGS. 6.A and 6.B

The MailBox class category is shown diagrammatically in FIGS. 6.A and 6.B. In each vote-server, there is exactly one MailBox object 68*o* that is responsible for maintaining communication with the library of C routines that is embedded into the application 60, and for creating and destroying the Instruction objects in the Instruction class category 70, FIG. 6.A.

FIG. 6.B is a diagrammatical representation of the InterProcess Communication message queue configuration for the vote-keeper, maintained by the MailBox object and the library of C Routines that is embedded into the groupware application.

All incoming InterProcess Communication 62 arrives on the same request message queue controlled by the InQ object 72*o*. For the InterProcess Communication facility supplied by Unix, each message queue is identified by a unique long integer supplied by the programmer. In the vote-keeper, the request queue's identifier is a large number, larger than can be stored in a short integer. Smaller numbers are reserved for outgoing return message queues.

Each application process 60 that communicates with the vote-server gets its own queue for return messages. This return queue is maintained, on the application side, by the embedded library of routines and, on the server side, by an OutQ object 74*o*, FIG. 6.B of the OutQ class 74*c*, FIG. 6.A. The return queue is established either by the vote-server, or by the calling process, whichever side of the communication needs the queue first.

The return queue bears an identifier equal to the calling process' id. This id, a short integer, is guaranteed by the operating system to be unique at any time. Using the process id as the message queue id in turn guarantees that each calling process always receives the return messages intended for it, even when there are many vote-server processes running on the same central processing unit.

In a very busy groupware system, it may be necessary to use two or more vote-servers. This is done by using a different large identifier for each server's request queue. The work is divided between the servers by sending all activity that pertains to one conference to one server and all the activity that pertains to another conference to another server.

The simple scheme of assigning the message queue id to be equal to the process id may not be possible in all operating systems. Indeed it is only possible if the range of possible queue ids has a subset that is disjoint from the range of possible process ids, which is the case in Unix. The essential points that need to be replicated in any scheme are 1) reserving one queue id for each server's request queue, and 2) establishing a one-to-one correspondence between the process id of the user and the user's return message queue id. In the rare event (never in Unix) that the return queue id for the application process turns out to be the same number as the reserved queue id of a server process, the application process can restart itself to obtain a new process id.

Another scheme for maintaining the return message queues is to identify the return queue by the calling user's user id. This scheme would be appropriate in an operating system where each user is only allowed one active computer process. This is not the case in Unix.

The list of active return queues, or OutQ objects, is maintained by the QList object 76*o*, FIG. 6.A which is contained in the MailBox object. This list is a singly-linked list with a reverse sort on creation time. This means that, when the list is searched, the search starts with the newest queue. This is done so that if any queues are dropped from the application side without notifying the vote-server, they will fall to the bottom of the search list. This happens when the application crashes, or, more usually, when a user hangs up the modem without following the proper exit procedures.

The message queue is checked periodically for inactive queues.

If inactive queues are found, they are dropped. This is done when the server is otherwise idle. The mechanism for timing the execution of this and all other "grooming" tasks is described in Postponing Grooming Tasks and Precipitating Grooming Tasks below.

Instruction Class Category—FIG. 7

FIG. 7 is a diagrammatical representation of many of the classes in the Instruction Class Category. It is an inheritance hierarchy used in object-oriented software designs to reduce duplicate code. At the top of the hierarchy is the abstract Instruction class **70*c*. All the classes inside the heavy circle 78** are abstract classes. Each instantiable class corresponds to one specific type of message that might be received by the vote-server through its incoming InterProcess Communication request queue.

When the MailBox object **68*o* receives a request on its request message queue, it creates the corresponding Instruction object. During the construction of the Instruction object, the actual request is passed along to the appropriate objects in the DataBase class category 66**, and any response is sent back through the MailBox object. After an Instruction object is completely constructed, its job is finished; so the object is destroyed. This is explained in greater detail in From Message to Execution, below.

DataBase Class Category—FIG. 8

FIG. 8 is a diagrammatical representation of the main classes in the DataBase class category. In each vote-keeper there is exactly one ConfList object **80*o* that maintains a list of all the active conferences in the vote-keeper, each conference becoming, in the software, an object of the Conf class 82*c***.

The Quick List-Attacher

Although maintaining ordered lists is well-known in the art, the ConfList class 80, an ordered list, does have one new device. As is common in the art, the list of Conf objects 82 is always searched before a new Conf object is made, to be sure that the new conference isn't already listed. When the search shows that the conference is, in fact, new to the database, a new Conf object is made and attached to the list in the proper order, which would ordinarily require a second search through the list. This second search is avoided in the vote-keeper by the following method.

When the list of Conf objects is searched and the target conference is not found, the search routine returns a pointer to the Conf object that should precede the new Conf object when it is added to the list. Then, rather than instructing the ConfList object to simply attach the new Conf object, the vote-keeper instructs the ConfList object to attach the new Conf object and specifies where to attach it, eliminating the second search.

The other list classes, the ItemList **84*c* and the VoterList 86*c*** discussed below, use the same search/attach method and all three (and possibly more) list classes can be parameterized, if parameterization is supported in the programming language.

Each object of the Conf class represents one conference or category heading in the groupware application. In the vote-keeper, each Conf object contains one object of the ItemList class **84*c*, responsible for maintaining a list of the items in the conference; one object of the VoterList class 86*c*, responsible for maintaining a list of the voters currently on-line and participating in the particular conference; and one object of the BallotBox class 88*c***.

As is common in the art, two data files are kept for each conference, one to store the schema and one to store the actual data, or votes in the case of the vote-keeper. Schema storage is discussed in Schema Storage below.

Ballot Storage and Retrieval—FIGS. 7 and 8

The BallotBox object is responsible for storing and retrieving the Voters' ballots, and it uses a very simple scheme, made possible by the specialization of the server.

All the ballots in one conference are maintained by the same BallotBox object and are stored in the same data file. All the ballots for the conference have the same size, but the size of the ballots varies as the conference progresses.

Ballots are stored in blocks, in order of user id, except for the last block in the file. The last block of the data file for the conference contains the newest members of that conference's community, also in user id order. When the block becomes crowded according to the BallotBox's self-grooming rules, the BallotBox requests a reordering of the ballots.

This request is sent to the server's own request queue as described in Postponing Grooming Tasks below. When the MailBox receives the reorder request, it sends it back to the BallotBox object. The BallotBox then reorders the whole data file so that all the ballots are in user id order and the last block is empty. The execution of this grooming task, and others, is timed so that it happens when the system is otherwise idle. See Data Grooming below.

The vote data are indexed by user id. The last user id in each block is kept in a list in memory for quick access. This index is adjusted when the data file is reordered.

The ballots, when they are copied from disk to memory, become instances of the Ballot class **90*c*, FIG. 8. On-line participants are represented in the software as objects of the Voter class 92*c***. Each Voter object contains and controls its Ballot object.

Each Voter object has a corresponding object of the OutQ class **74*c* which is part of the MailBox class category 68, described above. When a user first enters a conference, the groupware application sends an ENTERING request to the vote-server. The MailBox (refer back to FIG. 7, 68*o*) receives the ENTERING request and creates an Entering instruction FIG. 7, 91*c*. As the Entering instruction is being created, the KeepQ FIG. 7, 93*c*, NeedsQ FIG. 7, label 95*c*, and Instruction FIG. 7, 70*c*** constructor functions are executed because they are parent classes to the Entering class. The NeedsQ constructor creates an OutQ object whose message queue id equals the id of the user's process (discussed above). Subsequent instructions from the same user will be sent from the same process. This provides a key for finding the appropriate OutQ object for the subsequent requests.

Each OutQ object keeps a pointer to its corresponding Voter object so that when subsequent requests from the same process are received, the process' user's Voter object is immediately found once the correct OutQ is identified.

Item Class Category—FIGS. 8 and 9

The group of classes associated with the Item class category 94, FIG. 8 is shown diagrammatically in FIG. 9. The main class of the Item class category, the Item class **94*c* contains an ItemID class 96*c***, which can be easily modified to suit the particular groupware application. The vote-keeper's current version of the ItemID class allows each item three id numbers: 2 long integers and one short, in anticipation of networking votes and statistics to remote sites that also run the vote-server.

This follows the scheme used in Notesfile, a public domain networked conferencing system written by Ray Essick. The short integer holds the local identification; the items are listed at the local site in this order. The two long integers hold universal id's. The first universal id uniquely identifies the originating computer. The other id is generated by the originating computer and is unique among the items generated on the originating computer.

Objects of the ItemList class 84*c* keep two lists of the Items in the conference. The primary list links the Items in the order of their universal id's as explained above. The secondary list is a simple array where the elements are pointers to Item objects, kept in the order of the local id.

The vote-keeper anticipates three different types of vote data generated by groupware applications: 1) data for items that are not voted on, 2) data for items that are voted on, and 3) data for items that are voted on and grouped with other items. The third type of data is generated when several voted-on items are grouped together with a question like, "Vote for 5 of the following 10", or "Distribute 100 points over the next 20 items." Because of the architecture of the vote-keeper, additional vote types are easily added.

The three types of items are represented in the software by an inheritance hierarchy. The Item class 94*c*, FIG. 9 is at the top of the hierarchy. All items in the groupware application become objects of the Item class. If the item is not voted on (data type 1 above), it is only an Item object in the software and has no properties of the classes of objects further down the hierarchy. If the item is voted on (data types 2 and 3), in the vote-keeper, it is also a TalliedItem 98*c*. Grouped items in the application become objects of the GroupedItem class 100*c* in the software. Every time a group of items is created, one object of the ItemGroup class 102*c* is also created for controlling the group. All the ItemGroup objects in a particular conference are maintained in a list by the conference's GroupList 104*c*. The GroupList object is contained in the conference's ItemList 84*c*.

Dense Packing of Data/Distributed Dynamic Schema—FIGS. 8 and 10

FIG. 8 also shows a diagrammatical representation of the way objects in the DataBase class category work together. When a user enters the conference, a new Voter object is created and attached to the list of Voters maintained by the VoterList object. As the Voter object is being created, it asks the BallotBox object to retrieve the Voter's ballot from persistent storage. If the Voter is entering the conference for the first time, the BallotBox object makes a new, empty Ballot for the Voter. Ballot objects, unlike all the objects previously mentioned, have only data, no intelligence.

At the core of the vote-keeper is the method for dense packing of the vote data into the Ballot objects, herein after called ballots, made possible by the distribution of the data's schema over the Item objects.

FIG. 10 shows a diagrammatic representation the relationship between the items' vote characteristics and the way the vote data are packed into ballots. Each ballot has two main parts: the header 106; and the vote data 108. The header contains the user id of the voter, perhaps the last access time, and any other information about the user that the groupware application needs. The vote data portion of the ballot contains the data pertaining to the particular user's activity (accesses and votes) in the conference.

For the first vote-data type (items without a vote question), only one bit of storage is required to indicate whether or not the user has accessed the item. One byte of storage is allocated for each item that is voted on (vote types 2 and 3). An additional 2 bytes of storage is allocated for storing the sum of the user's votes for each group of grouped items; although this sum can be calculated each time it is needed and not stored if space is more important to conserve than computer time.

Every time a new item is introduced into the conference, the ItemList object 84*o*, FIG. 10 creates a new Item object 94*o*. The ItemList object assigns a particular byte in the ballots to the new Item object; and it assigns a particular bit in the designated byte to the new Item object, if the corresponding item in the groupware application is not voted on.

In the example depicted in FIG. 10, items 1 and 3 are not voted on in the application. They are each assigned one bit of storage in the first byte of vote data in each ballot. The next 6 unvoted-on items that are created in the groupware application will also keep their vote data in first byte, but in the subsequent bits of the first byte. When the 9th unvoted-on item is created, its datum is stored in the first bit of the next empty byte in the ballots. In this manner, each unvoted item gets one bit for storing its datum for the voter.

Item 2 in FIG. 10 is the first voted-on item in the example. Data for item 2 is kept in byte 2 of the vote records. Similarly, data for items 4, 5, and 6, are stored in bytes 3, 4, and 5. In the example, items 4, 5, and 6 are grouped together. Bytes 6 and 7 are allocated for storage of the sum of the user's votes on items 4, 5, and 6 42.

(If the vote-keeper relied on a conventional, generalized data management system, storing these data would require from 5 to 40 times more storage space. Because, in a generalized system, the schema must be fixed, each record would necessarily contain three fixed fields: the user id (2 bytes), an item identifier (at least 2 bytes), and the vote datum (1 byte). This means that 5 bytes or 40 bits of storage are necessary for each item/voter combination instead of the 1 byte, or more usually, 1 bit necessary in the specialized method.)

To update or access the vote stored for a particular item, the Voter object passes the memory address where its ballot stored to the appropriate Item object and asks it to mark or report the ballot. This is an easy, quick task for the Item object since it knows exactly where in the ballot its vote datum is kept. Therefore, each Item object keeps its part of the vote data schema.

Schema Storage

The ItemList object orchestrates the storage and retrieval of the schema. Storage is accomplished by cycling through the Item objects, in local id order, and asking each Item to store its information. It first stores a character to indicate the type of Item object, i.e., if it is a plain, Item, a TalliedItem, or a GroupedItem. It then stores its id and a record of its storage spot (i.e., it's part of the distributed schema) in the ballots. It also stores its current statistics although these can be recalculated from the ballots. If the item is a GroupedItem, and if it is the first item in its group, it asks its ItemGroup object to store itself.

On retrieval, the ItemList object peeks at the next byte in the file to discern the type of item that is next: plain Item, TalliedItem, or GroupedItem. It then creates that type of Item, and the constructor for the Item reads its own information from the file. If the Item is the first GroupedItem in a group, that first GroupedItem creates an ItemGroup object and the constructor for the ItemGroup reads its information from the file.

Although the statistics for the Items will change rapidly as users vote, these changes are only saved to disk when the server process is brought down. This is because the statistics are readily recalculated from the vote data (which is always kept up to date on disk) in the event of a system crash.

Schema-evolution only happens when new items are added to the conference or when old items are dropped or when the data are groomed. The schema on disk are updated whenever these operations occur.

From Message To Execution—FIG. 11

FIG. 11 shows diagrammatically how an incoming request message becomes an executed command and how a return reply is sent. The MailBox object 68*o* recognizes the type of the request and creates a new corresponding object in the Instruction hierarchy, an IVote object 112*o* in our example. Because an IVote object is also an AboutItem object 114*o* and a HasQ object 116*o*, the constructor functions for these objects are called before the body of the IVote constructor function is executed. The HasQ constructor finds the appropriate OutQ 74*o* for the return reply and, because each OutQ knows the address of its corresponding Voter object, the HasQ constructor also provides the appropriate Voter object 92*o* which contains the appropriate Ballot object 90*o*. The AboutItem constructor finds the appropriate Item object 94*o* so all the objects that participate in the requested voting transaction are available to the IVote constructor function.

The IVote constructor orchestrates the transaction by passing a vote() message 118 to the Voter object which responds by (1) asking the Item object to mark the ballot 120, and (2) asking the Item object to report the statistics on the item 122. The mark_ballot() function returns the old vote stored for the voter/item combination so that it is available for sending back to the application. The IVote object then asks the MailBox to send a reply 124 through the OutQ to the voter's application process. In this way, all the work associated with executing the request is completed as the corresponding Instruction object is constructed. The MailBox immediately deletes the Instruction object, or IVote object in the case of our example, and the vote-server is ready for the next request. Other request types are handled similarly.

Data Grooming—FIG. 12 and 6.B

Occasionally, as described in Ballot Storage and Retrieval above, the ballots need to be reordered. Also, when items are dropped from the conference, and when space is needed in the ballots, the ballots are collapsed to exclude each corresponding dropped Item object's storage byte(s) or bit. In this case, the dropped items' Item objects are deleted from the conference's ItemList and each remaining Item updates its knowledge of its storage spot to reflect the new arrangement in the ballots. In this way, both the vote data and the schema are updated as the conference progresses, resulting in distributed, dynamic schema.

The vote-keeper recognizes these and possibly other critical points in the accumulation of the data when, in order to maintain, deliver, and update the data efficiently, the data must undergo some transformation or "grooming". So that data delivery to the groupware application is not unnecessarily interrupted, the vote-keeper attempts to undertake all grooming tasks when the computer system, or at least the vote-keeper, is otherwise idle. This is accomplished by using a two-part method: (1) a postponing scheme whereby low-priority grooming needs are postponed until the server is otherwise idle, and (2) a precipitation scheme whereby the data are groomed before a real need arises and during times when the computer system is relatively idle.

Postponing Grooming Tasks—FIG. 12

FIG. 12 (expanded from FIG. 6.B.) shows diagrammatically the emergence of a task that is suitable for delaying and the method of delaying the grooming task. This method can be used to postpone any suitable task, including but not limited to the grooming tasks described in this document. Before an ItemList object 84*o* creates a new Item object, it calculates if there is space in the ballots for the new data that will be generated by the new item. If the ItemList detects an emerging need for a larger ballot (determined according to its grooming rules), it asks the MailBox 68*o* to send a low-priority request 126 to its own InQ 72*o* through the InterProcess Communication channel 62. This is the same InterProcess Communication channel (see FIG. 6.B) used by the application 60 to make its requests. The prioritization of requests is supplied by Unix's InterProcess Communication facility.

If the need for grooming becomes critical, a high-priority request is sent along the same channel. If the need becomes immediate, the data serving functions are suspended while the data are immediately groomed.

Precipitating Grooming Tasks—FIG. 13

The data are also methodically groomed when the operating system is idle. This part of the scheme is controlled by the main controlling function for the server.

The main controlling function for the server is shown diagrammatically in FIG. 13. The controlling function contains an indefinite loop that, over and over, asks the MailBox object to attempt to "deliver" a message 128. If the MailBox finds a request 130 on the request message queue, it creates the appropriate Instruction object as described in From Message to Execution above, and in doing so completes the execution of the request. When control returns to the main function, the inner loop segment 132 is traversed and the MailBox once again attempts to deliver a message.

The inner loop enters the MailBox::deliver() function through the <DON'T WAIT> entry 134 causing the MailBox::deliver() function to return to the main function immediately, even if there are no messages on the input queue. The <DON'T WAIT> entry is in contrast to the <WAIT> entry 136 which is used when the data are perfectly groomed so the MailBox::deliver() function will wait until there is an incoming request. After a request is found and executed, control returns to the inner <DON'T WAIT> loop.

If no incoming requests are found by the MailBox, not only are there no users waiting for a response, but also the data have no grooming needs that are urgent enough to trigger the grooming rules in the DataBase objects, described above. At this point, the operating system is queried for its activity level 138. If the system is busy, the server sleeps 140 a short while and once again traverses the inner loop.

However, if activity on the computer's central processing unit is sufficiently low, the ConfList object is requested 142 to find some even less immediate grooming task to do. When the ConfList judges 144 the state of the grooming to be perfect, control follows the outer <WAIT> loop 146 so that the server is quiet until a request is received. If grooming is not yet perfect, control once again joins in the inner <NO WAIT> loop so that, if there is not a request on the incoming message queue, another grooming task can be undertaken.

The method of postponing the grooming requests generated while the server is busy, and the method of generating and executing less urgent grooming tasks when the operating system is not busy, together keep the data so well-groomed that usually, a specific ballot is found in one disk read and only occasionally, for new participants to a conference, in two disk reads. Only if the central processing unit is heavily overloaded at all times will it be necessary to groom the data while the system is busy.

Conclusion

Thus the reader will see that the method of specializing a data management system herein described provides a system that is much more efficient than generalized data management systems in that:

1. The method minimizes the complexity and size of the application developer's task.
2. Processing time is minimized since the data are stored in their original, natural format.
3. The storage space necessary for maintaining the data is minimized since data packing can be as dense as possible.
4. The maintenance of data can be automated further than has been possible with generalized data maintenance systems.

In addition, the exemplary embodiment of the method, the vote-keeper, provides new ways to make democratic decisions.

While a particular embodiment of the invention is described above, it should be understood that changes can be made without departing from the spirit or scope of the invention. For example, a data management system can be specialized to keep test data, and other types of data. Indeed any application that uses a generalized database server would run more efficiently if the data were served by a specialized server.

Moreover, many of the inventive concepts described above can be rearranged such that the same functions are accomplished without departing from the essence of the inventive method. Therefore, this invention is not to be limited to the specific embodiment discussed and illustrated herein, but rather by the following claims and their legal equivalents.

What is claimed is:

1. In a computer system for processing a predetermined body of specialized data, comprising:

(a) a central processing unit, (b) a multiplicity of computer terminals, (c) an information storage device large enough to store said body of specialized data, (d) a multi-process operating system means wherein said operating system means runs a plurality of separate computing processes, and whereby each said separate computing process has an identifier that is unique during the time said separate process is executing, (e) means of communication between separate computing processes running under control of said operating system means, whereby said means of communication has facility for delivering messages in order of assigned priority, (f) user-interface means, said user-interface means comprising:

(1) means for receiving said specialized data from humans operating said user-interface at said terminals, (2) means for receiving commands regarding said data from said humans, (3) means for displaying the visual results of executing said commands on said terminals or other output devices;

a specialized data management method, said data management method comprising the steps of:

(a) establishing a user-interface process for each said human whereby said commands are received and the results of performing said commands are displayed, (b) establishing a specialized data base management process or a multiplicity of specialized data base management processes whereby said specialized data base management process consists of specialized software objects corresponding to said specialized data, and whereby said commands are executed by said specialized data base management process, and (c) establishing communication channels between said user-interface processes and said specialized data base management process(es) using said communication means whereby said received commands are communicated to said data base management processes, and the said results of executing said commands are communicated to said user-interface processes.

2. A method as defined in claim 1, wherein said server process additionally includes a method of distributing data schema, such method comprising the following steps, not necessarily taken in the following order:

(a) packing said data as densely as possible while maintaining a fixed position in each data record for each field in said data record, and ensuring that said records are of fixed size and contain a fixed number of fields at any moment in time, (b) creating schema objects that correspond to the real world objects represented by said fields, (c) identifying the byte and bit counts of the location, relative to a fixed location in said records, of each said schema object's datum within said records, and (d) storing said counts with said schema object's data members.

3. A method as defined in claim 2, wherein said server process additionally includes a method of dynamic evolution of said schema, such method comprising the following steps, not necessarily taken in the following order:

(a) establishing rules whereby said rules are designed to recognize when said data have become disordered or inefficiently arranged, (b) grooming said data whereby redundant or useless data are eliminated, remaining data are reordered and compacted, and, (c) adjusting said stored counts to reflect the new location of said schema object's data.

4. A method as defined in claim 3, wherein said server process additionally includes a method of postponing the said execution of said grooming until such time as said server is otherwise idle, said postponing method comprising the following steps, not necessarily taken in the following order:

(a) assigning a priority numeral to each said recognized need for said grooming, dependent on its urgency, (b) sending a request for said needed grooming, with said priority numeral attached, from said server process and to the same said server process, through said communication means, whereby said communication means delivers said grooming request only when there are no more urgent commands waiting to be executed.

5. A method as defined in claim 3, wherein said server process additionally includes a method of precipitating said execution of said grooming needs, whereby said grooming needs are recognized while they are emerging and before they are urgent and the execution of said emerging grooming needs are undertaken when said computer system is relatively idle, said method comprising the following steps, not necessarily taken in the following order:

(a) using said communication means, looking for incoming commands to execute, (b) if a command is found in step (a), executing the command, and repeating the process, beginning at step (a); otherwise, proceeding to step (c), (c) checking the activity level of said computer system, (d) if, in step (c), said activity level is found to be sufficiently high that the undertaking of said grooming needs is not desirable, remaining in an idle state for a small predetermined amount of time and repeating the process starting at step (a), (e) if, in step (c), said activity level is found to be sufficiently low, applying said rules to try to find an emerging grooming need, (f) if, in step (e), said emerging grooming need is found, executing said grooming associated with said emerging grooming need, and repeating the process, beginning at step (a), (g) if, in step (e), no said emerging grooming need is found, waiting for a command to arrive through said communication means, (h) executing said command found in step (g), and repeating the process, beginning at step (a).

6. A method as defined in claim 1, additionally including a method of transferring said commands from said communication means to said specialized software objects in said server process(es), such method comprising the following steps:

(a) creating an inheritance hierarchy of instruction classes whereby said hierarchy consists of a multiplicity of subclasses and superclasses and each said subclass and superclass includes a constructor method for creating objects of that subclass or superclass and wherein each type of said command is represented by exactly one instantiable subclass and wherein said superclasses of said instantiable classes are established to eliminate duplicate code in said instantiable classes, (b) causing, in each constructor function of each said instantiable class, that the specific said command corresponding to said instantiable class be executed by said specialized software object or multiplicity of said specialized software objects responsible for executing said command, (c) creating a mailbox object in each said server process wherein said mailbox object performs steps comprising:

(1) interpreting the type of said commands received through said communication means, and (2) for each said command received through said communication means, executing said constructor function to create an instruction object of a specific said instruction class wherein said instruction class corresponds to said type of said received command, thereby causing the execution of said command, (3) sending the results of the execution of said received command to said user-interface process through said communication means, and (4) causing the destruction of said instruction object.

7. A method as defined in claim 1, additionally including a method of organizing channels of communication provided by said communication means, such method comprising the following steps, not necessarily taken in the following order:

(a) running one or a multiplicity of said server processes on said operating system wherein each said server process maintains data about some specific predetermined mutually exclusive subset of the data, (b) running one said user-interface process for each human during the time that said human is participating in said generation of data and commands, (c) establishing one return communication channel connecting each said user-interface process with said specific server process that is responsible for the subset of data that pertains to said collected data and commands wherein each said return channel is assigned an identification number equal to the result of a one-to-one transformation of said process identification number of said user-interface process, and (d) establishing one request communication channel for each said server process wherein said request channel bears a unique, to said operating system, identification number that cannot be in the range of the result of said one-to-one transformation.

8. In a computer system for processing a body of vote data, comprising:

(a) a central processing unit, (b) a multiplicity of computer terminals, (c) an information storage device large enough to store said body of vote data, (d) a multi-process operating system means wherein said operating system means runs a plurality of separate computing processes and each said separate computing process has an identifier that is unique during the time that said separate process is executing, (e) means of communication between separate computing processes running under control of said operating system means, whereby said means of communication has facility for delivering messages in order of assigned priority, (f) groupware means, said groupware means comprising:

(1) means for receiving and organizing text messages from said humans operating said groupware means on said terminals, whereby said text messages which may or may not be questions put before the community for vote, (2) means for generating unique identifiers for said text messages, (3) means for receiving votes on said vote questions from said humans, (4) means for receiving commands regarding said votes, regarding said vote questions, and regarding statistics pertaining to participation in said groupware by said humans, and (5) means for displaying the visual results of executing said commands on said terminals or other output devices;

a vote data management method, said method comprising the steps of:

(a) establishing one or a multiplicity of vote server process(es) whereby said vote server process consists of specialized software objects corresponding to voters, lists of voters, ballots, lists of ballots, text messages, lists of text messages, conferences, a list of conferences, and wherein said vote server process (es) execute said commands, (b) establishing communication channels between said groupware means and said vote server process(es) using said communications means whereby said received commands are communicated to said vote server processes, and said results of executing said commands are communicated to said groupware means.

9. A method as defined in claim 8, wherein said server process additionally includes a method of distributing the vote data schema, such method comprising the following steps, not necessarily taken in the following order:

(a) assigning one bit in each said ballot object for storage of the datum representing said user's participation for each said text message object where no vote is to be taken, (b) storing the data for eight said no vote text message objects in the eight bits of one byte, (e) assigning one byte in each said ballot object for storage of the vote datum for each voted on text message, (f) maintaining a fixed position in each said ballot object for said text message object, and ensuring that said ballot objects are of fixed size any moment in time, (g) identifying the byte and bit counts of the location, relative to some predetermined fixed location in said ballot objects, of each text message's datum within said ballots, and (i) storing said counts with said message text object's data members.

10. A method as defined in claim 9, wherein said vote-server process additionally includes a method of dynamic evolution of said distributed vote data schema, such method comprising the following steps, not necessarily taken in the following order:

(a) establishing rules whereby said rules are designed to recognize when said vote data have become disordered or inefficiently arranged, (b) grooming said vote data whereby redundant or useless vote data are eliminated, remaining vote data are reordered and compacted, and (c) adjusting said stored counts to reflect the new location of said message text objects' data.

11. A method as defined in claim 10, wherein said server process additionally includes a method of postponing execution of said grooming until such time as said server is otherwise idle, said postponing method comprising the following steps, not necessarily taken in the following order:

(a) assigning a priority numeral to each said recognized data grooming need, dependent on its urgency, (b) sending a request for said grooming, with said priority numeral attached, from said server process and to the same said server process, through said communication means, whereby said communication means delivers said grooming request only when there are no more urgent commands waiting to be executed.

12. A method as defined in claim 11, wherein said vote server process additionally includes a method of precipitating emerging grooming needs, whereby said grooming needs are recognized while they are emerging and before they are urgent and the execution of said emerging grooming needs are undertaken when said computer system is relatively idle, such method comprising the following steps, not necessarily taken in the following order:

(a) using said communication means, looking for incoming commands to execute, (b) if a command is found in step (a), executing the command, and repeating the process, beginning at step (a); otherwise, proceeding to step (c), (c) checking the activity level of said computer system, (d) if, in step (c), said activity level is found to be sufficiently high that the undertaking of grooming tasks is not desirable, remaining in an idle state for a small predetermined amount of time and repeating the process g at step (a), (e) if, in step (c), said activity level is found to be sufficiently low, applying rules to try to find an emerging grooming need, (f) if, in step (e), said emerging grooming need is found, executing said grooming associated with said emerging grooming need, and repeating the process, beginning at step (a), (g) if, in step (e), no emerging grooming-need is found, waiting for a command to arrive through said communication means, (h) executing said command found in step (g), and repeating the process, beginning at step (a),

13. A method as defined in claim 8, additionally including a method of organizing channels of communication provided by said communication means, such method comprising the following steps, not necessarily taken in the following order:

(a) running one or a multiplicity of said server processes on said operating system wherein each said server process maintains data about some specific predetermined mutually exclusive subset of the vote data, (b) running one said groupware process for each human during the time that said human is participating in said generation of data and commands, (c) establishing one return communication channel connecting each said groupware process with said specific server process that is responsible for the subset of data that pertains to said collected data and commands wherein each said return channel is assigned an identification number equal to the result of a one-to-one transformation of the process id of said groupware process, and (d) establishing one request communication channel for each said server process wherein said request channel bears a unique, to said operating system, identification number that cannot be in the range of the result of said one-to-one transformation.

14. A method as defined in claim 8, additionally including a method of transferring said commands from said communication means to said specialized software objects in said vote server process(es), such method comprising the following steps:

(a) creating an inheritance hierarchy of instruction classes whereby said hierarchy consists of a multiplicity of subclasses and superclasses and each subclass and superclass includes a constructor method for creating objects of that subclass or superclass and wherein each type of command is represented by exactly one instantiable subclass and wherein the superclasses of said instantiable subclasses are established to eliminate duplicate code in said instantiable subclasses, (b) causing, in each constructor function of each said instantiable subclass, that the specific said command corresponding to said instantiable subclass be executed by said specific software object responsible for executing said command, (c) creating a mailbox object in each said server process wherein said mailbox object performs steps comprising:

(1) interpreting the type of commands received through said communication means, and (2) for each command received through said communication means, creating an instruction object of a specific said instruction subclass wherein said instruction subclass corresponds to said type of said received command, (3) sending the results of said execution of said received command to said groupware process through said communication means, and (4) causing the destruction of said instruction object.

15. In a computer system with a storage area sufficient for storing a predetermined quantity of data, and a data maintenance means in which ordered lists of subsets of said data are maintained, a method of inserting a new object into said ordered list, such method comprising the following steps:

(a) searching said ordered list for said new object, (b) if said new object is found in step (a), insertion of said new object is not necessary so, terminating said insertion method, (c) if said new object is not found in step (a), noting the object in said ordered list that would precede said new object if said new object were already in said ordered list, and (d) inserting said new object after said noted object.

* * * * *